United States Patent
Nakajima et al.

(10) Patent No.: US 9,807,274 B2
(45) Date of Patent: Oct. 31, 2017

(54) COOPERATION SYSTEM INCLUDING COOPERATING PORTABLE INFORMATION DEVICE AND IMAGE PROCESSING APPARATUS, AND COOPERATION METHOD

(71) Applicant: Konica Minolta, Inc., Chiyoda-ku, Tokyo (JP)

(72) Inventors: Tomoaki Nakajima, Kobe (JP); Atsushi Ohshima, Amagasaki (JP); Toshihiko Otake, Ikeda (JP); Hiroaki Kubo, Muko (JP); Takehisa Yamaguchi, Ikoma (JP); Toshimichi Iwai, Nara-ken (JP); Masaya Hashimoto, Itami (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/805,013

(22) Filed: Jul. 21, 2015

(65) Prior Publication Data
US 2016/0028919 A1 Jan. 28, 2016

(30) Foreign Application Priority Data
Jul. 23, 2014 (JP) .............................. 2014-149860

(51) Int. Cl.
*G06F 15/16* (2006.01)
*H04N 1/327* (2006.01)
(Continued)

(52) U.S. Cl.
CPC ..... *H04N 1/32776* (2013.01); *H04N 1/00307* (2013.01); *H04N 1/00411* (2013.01); *H04N 1/32745* (2013.01)

(58) Field of Classification Search
CPC ........... H04N 1/00244; H04N 1/00127; H04N 1/00307; H04N 1/00411; H04N 1/32745; (Continued)

(56) References Cited

U.S. PATENT DOCUMENTS

2003/0008650 A1* 1/2003 Matsuyama ........ H04M 3/4938 709/201
2004/0073684 A1* 4/2004 Jodra ................. H04N 1/00244 709/228
(Continued)

FOREIGN PATENT DOCUMENTS

JP 2014-013618 A 1/2014

*Primary Examiner* — Chad Dickerson
(74) *Attorney, Agent, or Firm* — Buchanan Ingersoll & Rooney PC

(57) ABSTRACT

Portable information devices each include a portable-side communication unit to communicate with an image processing apparatus within a range of a predetermined distance, and a portable-side control unit. The portable-side control unit executes the steps of: specifying a linked process; displaying an operation screen for accepting a setting value corresponding to the linked process in a state in which the portable-side communication unit is unable to communicate with the image processing apparatus; accepting a setting value from a user; in response to the portable-side communication unit becoming able to communicate with the image processing apparatus, transmitting a setting request and receiving a response to the setting request from the image processing apparatus; if the response indicates to start the linked process, transmitting/receiving data in cooperation with the image processing apparatus; and if the response requests a setting value, displaying an operation screen for setting the requested setting value.

8 Claims, 9 Drawing Sheets

(51) Int. Cl.
  *H04N 1/00* (2006.01)
  *G06F 3/12* (2006.01)
(58) Field of Classification Search
  CPC . H04N 1/32776; G06F 3/1222; G06F 3/1238; G06F 3/1285–3/1289; G06F 3/129; G06F 3/1292; G06F 21/31; G06F 21/608
  USPC ......... 358/1.1, 1.9, 2.1, 1.11–1.18, 400–404; 709/201–203, 208–219; 455/41.1–41.3; 726/1–5, 17, 21, 26–33; 713/182, 183, 713/186
  See application file for complete search history.

(56) References Cited

U.S. PATENT DOCUMENTS

| | | | |
|---|---|---|---|
| 2004/0117389 A1* | 6/2004 | Enami | G06F 3/1222 |
| 2007/0124537 A1* | 5/2007 | Fujishita | G06F 21/31 |
| | | | 711/115 |
| 2009/0052348 A1* | 2/2009 | Kato | H04L 63/0492 |
| | | | 370/254 |
| 2013/0229690 A1* | 9/2013 | Sumita | H04N 1/00127 |
| | | | 358/1.15 |
| 2014/0009783 A1* | 1/2014 | Chakirov | G06K 15/40 |
| | | | 358/1.15 |

* cited by examiner

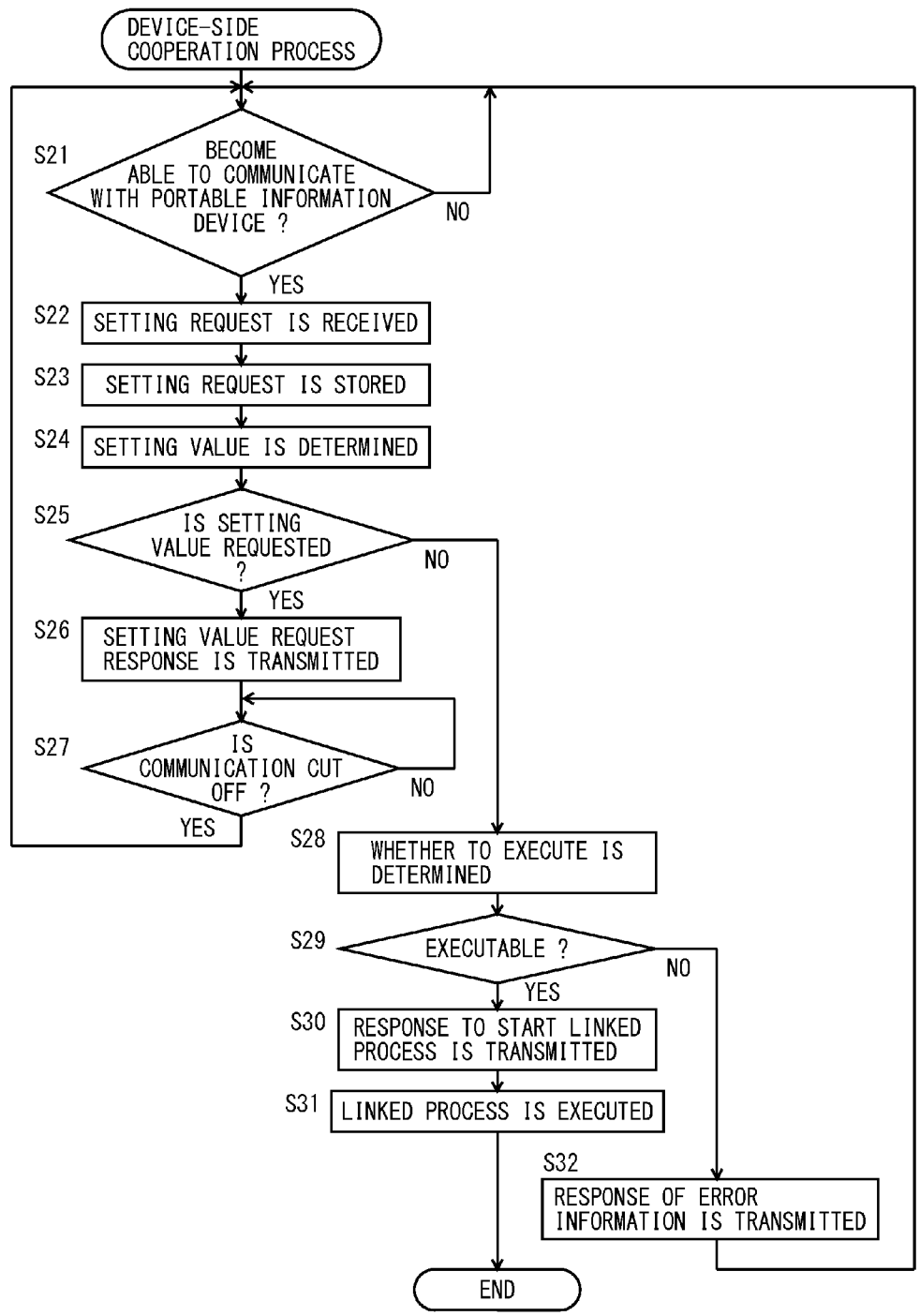

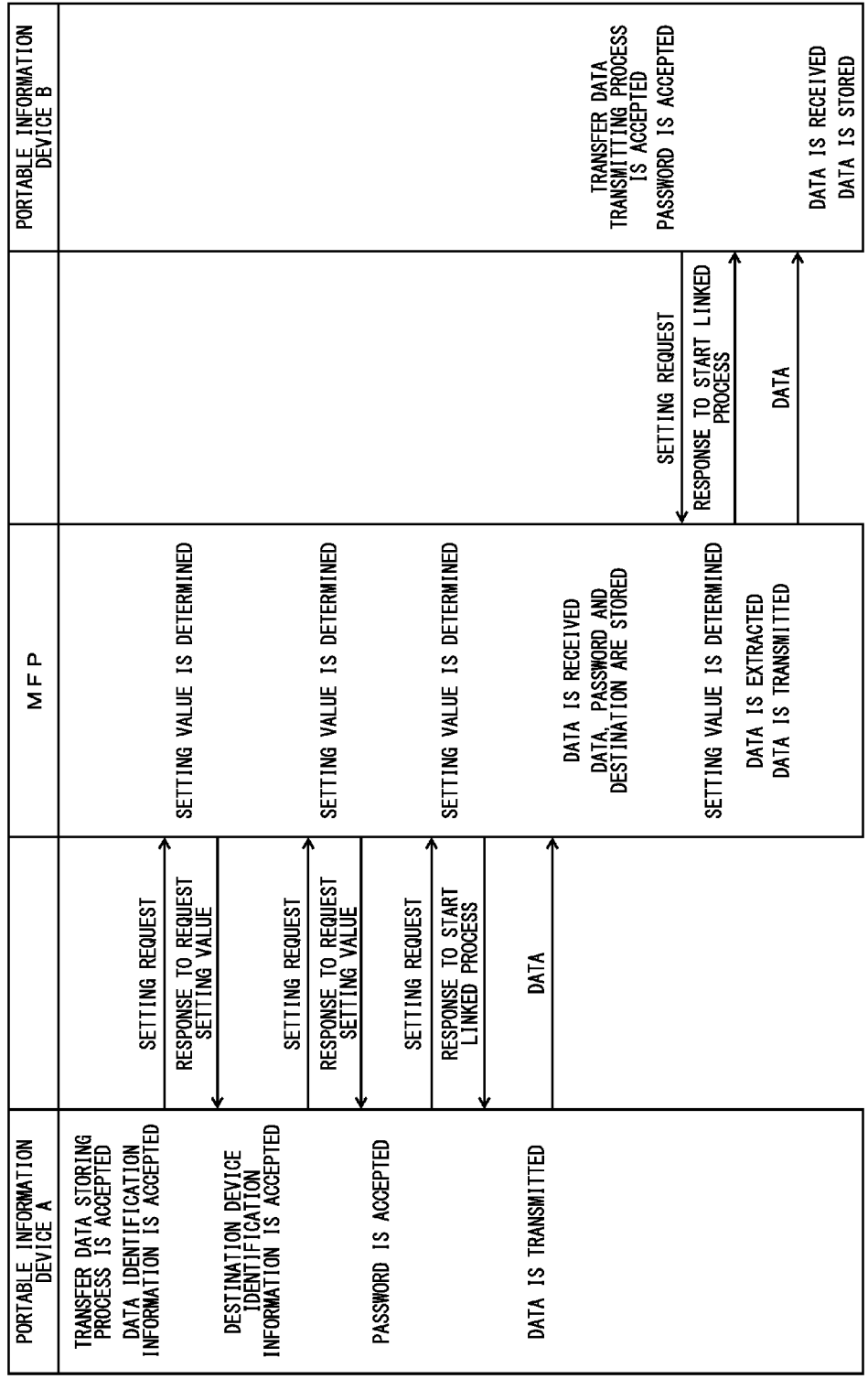

COOPERATION SYSTEM INCLUDING COOPERATING PORTABLE INFORMATION DEVICE AND IMAGE PROCESSING APPARATUS, AND COOPERATION METHOD

This application is based on Japanese Patent Application No. 2014-149860 filed with Japan Patent Office on Jul. 23, 2014, the entire content of which is hereby incorporated by reference.

BACKGROUND OF THE INVENTION

Field of the Invention

The present invention relates to a cooperation system and a cooperation method, and more particularly to a cooperation system including a portable information device and an image processing apparatus capable of communicating with the portable information device, and a cooperation method performed in the cooperation system.

Description of the Related Art

There is a technique for transmitting data from a portable information device to a Multi Function Peripheral (MFP). For example, Japanese Patent Laid-Open Publication No. 2014-013618 describes a portable terminal including a communication unit for communicating with an MFP and a data storage unit for storing data to be transmitted/received to/from the MFP. The MFP includes a LAN communication unit and a Bluetooth communication unit for communicating with the portable terminal, a connection mode determination unit for determining a mode of connection with the portable terminal, and a data processing unit for processing data to be transmitted/received to/from the portable terminal based on the determined connection mode.

According to the technique described in Japanese Patent Laid-Open No. 2014-013618, however, when the portable terminal and the MFP are connected, the user has to decide which to use of communication through the LAN communication unit and communication through the Bluetooth communication unit. The operation for allowing the portable terminal to communicate with the MFP is thus cumbersome.

Portable information devices typified by smartphones have a function of communicating through a short-range wireless communication system called NFC (Near Field Communication). A smartphone is brought closer to an MFP supporting NFC to allow the portable information device to communicate with the MFP through the NFC system and establish a communication path between the portable information device and the MFP through a different communication system such as a wireless LAN. This technique is called handover. Once a communication path is established between the portable information device and the MFP, the portable information device can remotely control the MFP.

However, in order to confirm whether the instruction input to the portable information device has been transmitted to the MFP and executed, a reply from the MFP has to be displayed on the portable information device, or the operation of the MFP has to be checked. The operation is thus cumbersome.

SUMMARY OF THE INVENTION

In order to achieve the object, according to an aspect of the present invention, a cooperation system is provided, in which data is transmitted/received between a plurality of portable information devices through an image processing apparatus. The plurality of portable information devices each include a portable-side communication unit to communicate with the image processing apparatus within a range of a predetermined distance, and a portable-side control unit. The portable-side control unit executes: a linked process specifying step of specifying a linked process to be executed by the image processing apparatus; an operation screen display step of displaying on a display device an operation screen for accepting a setting value corresponding to the specified linked process, in a state in which the portable-side communication unit is unable to communicate with the image processing apparatus; an operation accepting step of accepting a setting value input by a user in a state in which the operation screen is displayed; a portable-side communication control step of, in response to the portable-side communication unit becoming able to communicate with the image processing apparatus after an operation is accepted in the operation accepting step, transmitting a setting request including device identification information for identifying the portable information device, process identification information for identifying the linked process to be executed by the image processing apparatus, and the accepted setting value, and receiving a response to the setting request from the image processing apparatus, in a communication period in which the portable-side communication unit is able to communicate with the image processing apparatus; a portable-side cooperation step of, if the response received in the portable-side communication control step indicates to start the linked process, transmitting/receiving data in cooperation with the image processing apparatus; and a step of, if the response received in the portable-side communication control step requests a setting value, displaying an operation screen for setting the requested setting value, in response to termination of the communication period in which the portable-side communication unit receives the response from the image processing apparatus. The image processing apparatus includes a device-side communication unit to communicate with the portable-side communication unit of each of the plurality of portable information devices, and a device-side control unit. The device-side control unit executes: a device-side communication control step of, in response to the device-side communication unit becoming able to communicate with one of the plurality of portable information devices, receiving a setting request from an access device and returning a response corresponding to the setting request to the access device in a communication period in which the device-side communication unit is able to communicate with the access device, the access device being one of the plurality of portable information devices that the device-side communication unit becomes able to communicate with; a setting value determining step of determining whether all of one or more setting values to be used in the linked process specified by process identification information included in the setting request received in the device-side communication control step have been received; a device-side cooperation step of, if it is determined that all of the one or more setting values have been received in the setting value determining step, in response to the setting request being received, executing the linked process specified by the process identification information included in the setting request received by the device-side communication control unit; and a response transmitting step of, if it is determined that all of the one or more setting values have not been received in the setting value determining step, in response to the setting request being received, returning to the access device a response for requesting the not-received setting value among the one or more setting values to be used in the linked process and, thereafter if it is determined that all of the one or more setting values have been received in the setting valve determining step, returning a response indicating to start the linked process to the access device. The device-side cooperation step includes a device-side transmitting/receiving step of transmitting/receiving data in cooperation with the access device.

According to another aspect of the present invention, a cooperation system is executed in an image processing apparatus and a portable information device capable of communicating with the image processing apparatus. The portable information device includes a portable-side communication unit to communicate with the image processing apparatus within a range of a predetermined distance, and a portable-side controller. The portable-side controller executes: a linked process specifying step of specifying a linked process to be executed by the image processing apparatus; an operation screen display step of displaying on a display device an operation screen for accepting a setting value corresponding to the specified linked process, in a state in which the portable-side communication unit is unable to communicate with the image processing apparatus; an operation accepting step of accepting a setting value input by a user in a state in which the operation screen is displayed; a portable-side communication control step of, in response to the portable-side communication unit becoming able to communicate with the image processing apparatus after an operation is accepted in the operation accepting step, transmitting a setting request including device identification information for identifying the portable information device, process identification information for identifying the linked process, and the accepted setting value, and receiving a response to the setting request from the image processing apparatus, in a communication period in which the portable-side communication unit is able to communicate with the image processing apparatus; and a step of, if the response received in the portable-side communication control step requests a setting value, displaying an operation screen for setting the setting value requested by the received response, in response to termination of the communication period in which the portable-side communication unit receives the response from the image processing apparatus. The image processing apparatus includes a device-side communication unit to communicate with the portable-side communication unit of the portable information device, and a device-side controller. The device-side controller executes: a device-side communication control step of, in response to the device-side communication unit becoming able to communicate with the portable information device, receiving a setting request from the portable information device and returning a response to the setting request to the portable information device, in a communication period in which the device-side communication unit is able to communicate with the portable information device; a setting value determining step of determining whether all of one or more setting values to be used in the linked process specified by the process identification information included in the setting request received in the device-side communication control step have been received; and a device-side cooperation step of, if it is determined that all of the one or more setting values have been received in the setting value determining step, executing the linked process specified by the process identification information included in the setting request received in the device-side communication control step. The device-side communication control step includes a response transmitting step of, if it is determined that all of the one or more setting values have not been received in the setting value determining step, in response to the setting request being received, returning a response for requesting transmission of the not-received setting value of the one or more setting values to be used in the linked process to the portable information device.

According to a further aspect of the present invention, a cooperation method is performed in a cooperation system in which data is transmitted/received between a plurality of portable information devices through an image processing apparatus. The plurality of portable information devices each include a portable-side communication unit to communicate with the image processing apparatus within a range of a predetermined distance, and a portable-side control unit. The method allows the portable-side control unit to execute: a linked process specifying step of specifying a linked process to be executed by the image processing apparatus; an operation screen display step of displaying on a display device an operation screen for accepting a setting value corresponding to the specified linked process, in a state in which the portable-side communication unit is unable to communicate with the image processing apparatus; an operation accepting step of accepting a setting value input by a user in a state in which the operation screen is displayed; a portable-side communication control step of, in response to the portable-side communication unit becoming able to communicate with the image processing apparatus after an operation is accepted in the operation accepting step, transmitting a setting request including device identification information for identifying the portable information device, process identification information for identifying the linked process to be executed by the image processing apparatus, and the accepted setting value, and receiving a response to the setting request from the image processing apparatus, in a communication period in which the portable-side communication unit is able to communicate with the image processing apparatus; a portable-side cooperation step of, if the response received in the portable-side communication control step indicates to start the linked process, transmitting/receiving data in cooperation with the image processing apparatus; and a step of, if the response received in the portable-side communication control step requests a setting value, displaying an operation screen for setting the requested setting value, in response to termination of the communication period in which the portable-side communication unit receives the response from the image processing apparatus. The image processing apparatus includes a device-side communication unit to communicate with the portable-side communication unit of each of the plurality of portable information devices, and a device-side control unit. The method allows the device-side control unit to execute: a device-side communication control step of, in response to the device-side communication unit becoming able to communicate with one of the plurality of portable information devices, receiving a setting request from an access device and returning a response corresponding to the setting request to the access device in a communication period in which the device-side communication unit is able to communicate with the access device, the access device being one of the plurality of portable information devices that the device-side communication unit becomes able to communicate with; a setting value determining step of determining whether all of one or more setting values to be used in the linked process specified by process identification information included in the setting request received in the device-side communication control step have been received; a device-side cooperation step of, if it is determined that all of the one or more setting values have been received in the setting value determining step, in response to the setting request being received, executing the linked process specified by the process identification information included in the setting request received by the device-side communication control unit; and a response transmitting step of, if it is determined that all of the one or more setting values have not been received in the setting value determining step, in response to the setting request being received, returning to the access device a response for requesting the not-received setting value among the one or more setting values to be used in the linked process and, thereafter if it is determined that all of the one or more setting values have been received in the setting valve determining step, returning a response indicating to start the linked process to the access device. The device-side cooperation step includes a device-side transmitting/receiving step of transmitting/receiving data in cooperation with the access device.

According to yet another aspect of the present invention, a cooperation method is performed in an image processing apparatus and a portable information device capable of communicating with the image processing apparatus. The portable information device includes a portable-side communication unit to communicate with the image processing apparatus within a range of a predetermined distance, and a portable-side controller. The method allows the portable-side controller to execute: a linked process step of specifying a linked process to be executed by the image processing apparatus; an operation screen display step of displaying on a display device an operation screen for accepting a setting value corresponding to the specified linked process, in a state in which the portable-side communication unit is unable to communicate with the image processing apparatus; an operation accepting step of accepting a setting value input by a user in a state in which the operation screen is displayed; a portable-side communication control step of, in response to the portable-side communication unit becoming able to communicate with the image processing apparats after an operation is accepted in the operation accepting step, transmitting a setting request including device identification information for identifying the portable information device, process identification information for identifying the linked process, and the accepted setting value, and receiving a response to the setting request from the image processing apparatus, in a communication period in which the portable-side communication unit is able to communicate with the image processing apparatus; and a step of, if the response received in the portable-side communication control step requests a setting value, displaying an operation screen for setting the setting value requested by the received response, in response to termination of the communication period in which the portable-side communication unit receives the response from the image processing apparatus. The image processing apparatus includes a device-side communication unit to communicate with the portable-side communication unit of the portable information device, and a device-side controller. The method allows the device-side controller to execute: a device-side communication control step of, in response to the device-side communication unit becoming able to communicate with the portable information device, receiving a setting request from the portable information device and returning a response to the setting request to the portable information device, in a communication period in which the device-side communication unit is able to communicate with the portable information device; a setting value determining step of determining whether all of one or more setting values to be used in the linked process specified by the process identification information included in the setting request received in the device-side communication control step have been received; and a device-side cooperation step of, if it is determined that all of the one or more setting values have been received in the setting value determining step, executing the linked process specified by the process identification information included in the setting request received in the device-side communication control step. The device-side communication control step includes a response transmitting step of, if it is determined that all of the one or more setting values have not been received in the setting value determining step, in response to the setting request being received, returning a response for requesting transmission of the not-received setting value of the one or more setting values to be used in the linked process to the portable information device.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 9 is a flowchart showing an example of the procedure of a device-side cooperation process.

FIG. 10 is a diagram showing an example of the procedure of a cooperation process.

DESCRIPTION OF THE PREFERRED EMBODIMENTS

Figure 1:
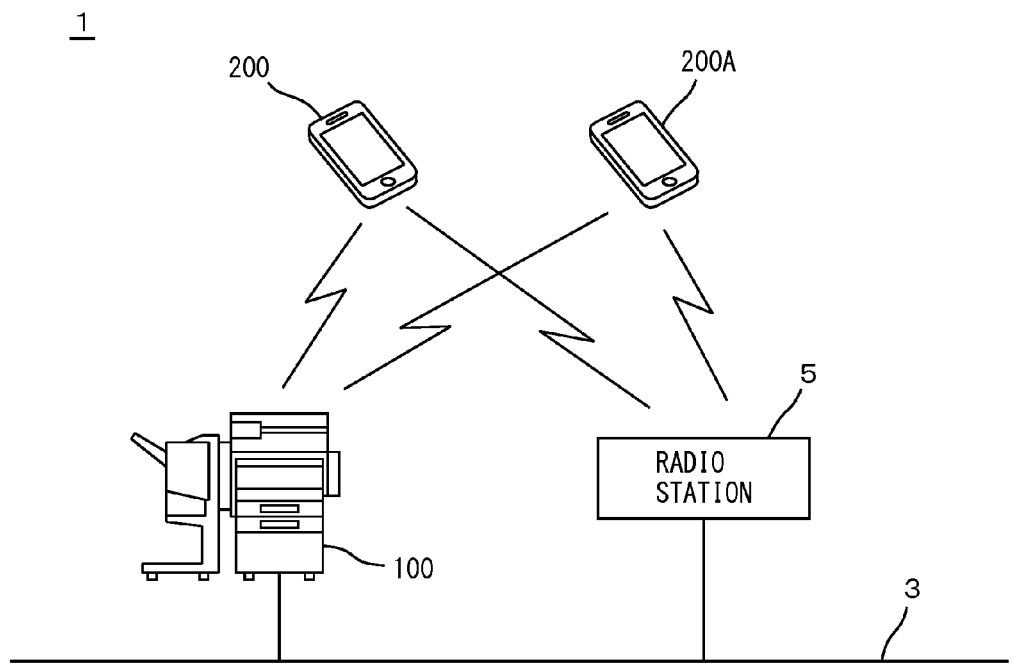
FIG. 1 is a diagram showing an overview of a cooperation system in an embodiment of the present invention.

Embodiments of the present invention will be described below in conjunction with the figures. In the following description, the same parts are denoted with the same reference numerals. Their names and functions are also the same. A detailed description thereof is therefore not repeated.

FIG. 1 is a diagram showing an overview of a cooperation system in an embodiment of the present invention. Referring to FIG. 1, cooperation system 1 includes a Multi Function Peripheral (hereinafter referred to as "MFP") 100 functioning as an image processing apparatus and portable information devices 200, 200A. MFP 100 is connected to a network 3.

Portable information devices 200, 200A are computers carried by users, such as smartphones and PDAs (Personal Digital Assistants). Here, portable information devices 200, 200A are smartphones and have a call function. Portable information devices 200, 200A can make a call by communicating with a base station for mobile phones by radio to connect to a mobile phone network. Portable information devices 200, 200A each can communicate with MFP 100 via wireless communication through a short-range wireless system.

Network 3 is a local area network (LAN), either wired or wireless. Network 3 is not limited to a LAN but may be a network using the Public Switched Telephone Network.

A radio station 5 is a relay for network 3 and communicates with portable information devices 200, 200A having a wireless LAN communication function to connect portable information devices 200, 200A to network 3. Portable information devices 200, 200A thus can transmit/receive data to/from MFP 100 through radio station 5 and network 3.

Although MFP 100 connected to network 3 is shown by way of example, MFP 100 may be connected to the Internet. The connection may be either wired or wireless. Although cooperation system 1 in FIG. 1 includes a single MFP 100, the number of MFPs may be one or more. Although cooperation system 1 shown includes two portable information devices 200, 200A, the number of portable information devices may be one or more. Portable information devices 200, 200A have the same functions. Here, portable information device 200 is taken as an example unless otherwise specified.

Figure 2:
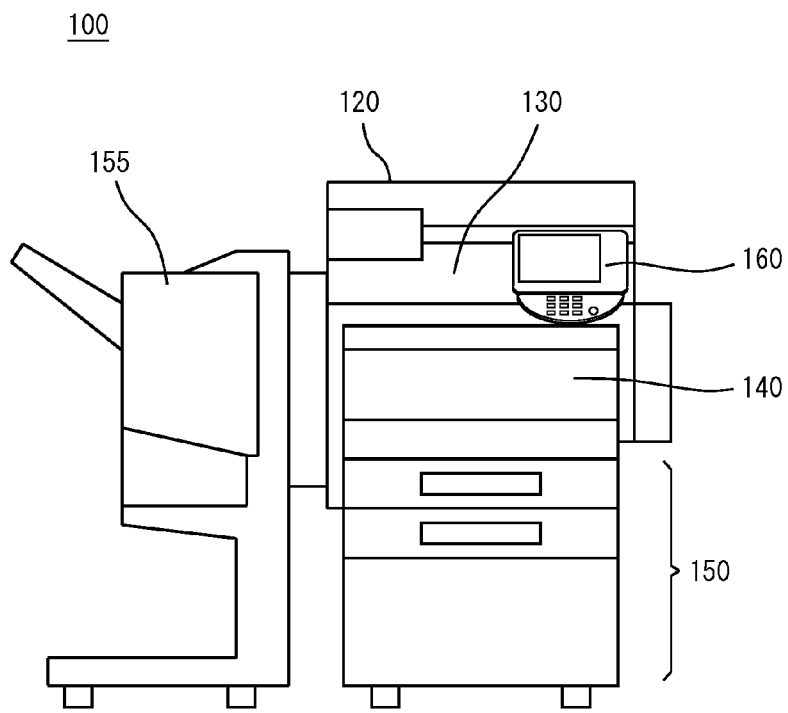
FIG. 2 is an external perspective view of an MFP.
Figure 3:
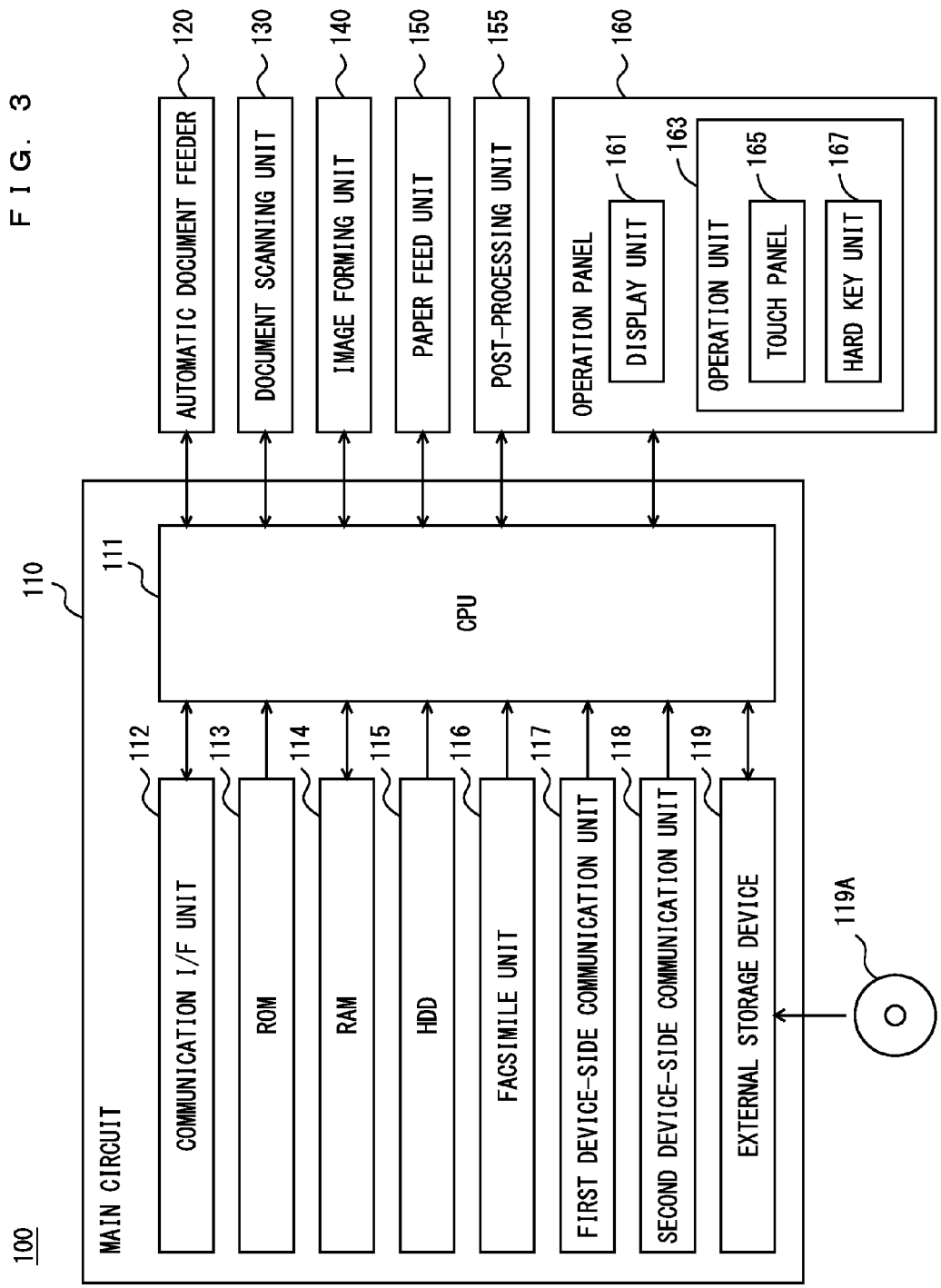
FIG. 3 is a block diagram showing the overall hardware configuration of the MFP.

FIG. 2 is an external perspective view of the MFP. FIG. 3 is a block diagram showing the overall hardware configuration of the MFP. Referring to FIG. 2 and FIG. 3, MFP 100 includes a main circuit 110, a document scanning unit 130 for scanning a document, an automatic document feeder 120 for conveying a document to document scanning unit 130, an image forming unit 140 for forming an image on paper or other medium based on image data output by document scanning unit 130 scanning a document, a paper feed unit 150 for supplying paper to image forming unit 140, a post-processing unit 155 for processing paper having an image formed thereon, and an operation panel 160 serving as a user interface.

Post-processing unit 155 executes a sorting process of sorting one or more sheets of paper having an image formed by image forming unit 140 and discharging the sorted paper, a punching process of punching holes, and a stapling process of driving a staple.

Main circuit 110 includes a CPU 111, a communication interface (I/F) unit 112, a ROM 113, a RAM 114, a hard disk drive (HDD) 115 as a mass storage device, a facsimile unit 116, a first device-side communication unit 117, a second device-side communication unit 118, and an external storage device 119 to which a CD-ROM 119A (Compact Disc ROM) is attached. CPU 111 is connected to automatic document feeder 120, document scanning unit 130, image forming unit 140, paper feed unit 150, post-processing unit 155, and operation panel 160 to control the entire MFP 100.

ROM 113 stores a program executed by CPU 111 or data necessary for executing the program. RAM 114 is used as a work area when CPU 111 executes a program.

Communication I/F unit 112 is an interface for connecting MFP 100 to network 3. CPU 111 communicates with portable information devices 200, 200A through communication I/F unit 112 to transmit/receive data.

Facsimile unit 116 is connected to the Public Switched Telephone Network (PSTN) to transmit facsimile data to the PSTN or receive facsimile data from the PSTN. Facsimile unit 116 stores the received facsimile data into HDD 115 or outputs it to image forming unit 140. Image forming unit 140 prints the facsimile data received from facsimile unit 116 on paper. Facsimile unit 116 also converts data stored in HDD 115 into facsimile data and transmits the converted facsimile data to a facsimile machine connected to the PSTN.

First device-side communication unit 117 communicates by radio with portable information device 200 based on the NFC standards. First device-side communication unit 117 communicates with portable information device 200 when the distance from portable information device 200 is equal to or shorter than a first distance. The first distance is, for example, ten and a few centimeters.

Second device-side communication unit 118 performs pairing with portable information device 200 based on the Bluetooth (registered trademark) standards to perform P-to-P (peer to peer) communication by radio. Second device-side communication unit 118 can communicate with portable information device 200 when the distance to portable information device 200 is equal to or shorter than a second distance that is longer than the first distance. The second distance is, for example, ten and a few meters or longer. Second device-side communication unit 118 may be an interface for wireless communication based on the Wi-Fi (Wireless Fidelity) standards, the IrDA (Infrared Data Association) standards, or other standards.

First device-side communication unit 117 may allow second device-side communication unit 118 to be paired with portable information device 200 so that second device-side communication unit 118 can communicate with one of portable information devices 200, 200. For example, the user brings portable information device 200 closer within the range of the first distance from first device-side communication unit 117, so that second device-side communication unit 118 becomes able to communicate with portable information device 200. Since the user's operation of bringing portable information device 200 closer to MFP 100 is determined to be the operation of giving an instruction for pairing, the user does not have to perform an operation at portable information device 200 for designating MFP 100 as a destination.

CD-ROM 119A is attached to external storage device 119. CPU 111 can access CD-ROM 119A through external storage device 119. CPU 111 loads the program recorded on CD-ROM 119A attached to external storage device 119 into RAM 114 for execution. The program executed by CPU 111 can be stored not only in CD-ROM 119A but also in other medium such as an optical disk (MO (Magnetic Optical Disc)/MD (Mini Disc)/DVD (Digital Versatile Disc)), an IC card, an optical card, and a semiconductor memory such as a mask ROM, an EPROM (Erasable Programmable ROM), and an EEPROM (Electrically EPROM).

The program executed by CPU 111 is not limited to a program recorded on CD-ROM 119A. A program stored in HDD 115 may be loaded into RAM 114 for execution. In this case, another computer connected to network 3 may overwrite the program stored in HDD 115 of MFP 100 or additionally write a new program. MFP 100 may download a program from another computer connected to network 3 and store the program into HDD 115. The program herein referred to includes not only a program directly executable by CPU 111 but also a source program, a compressed program, and an encrypted program.

Figure 4:
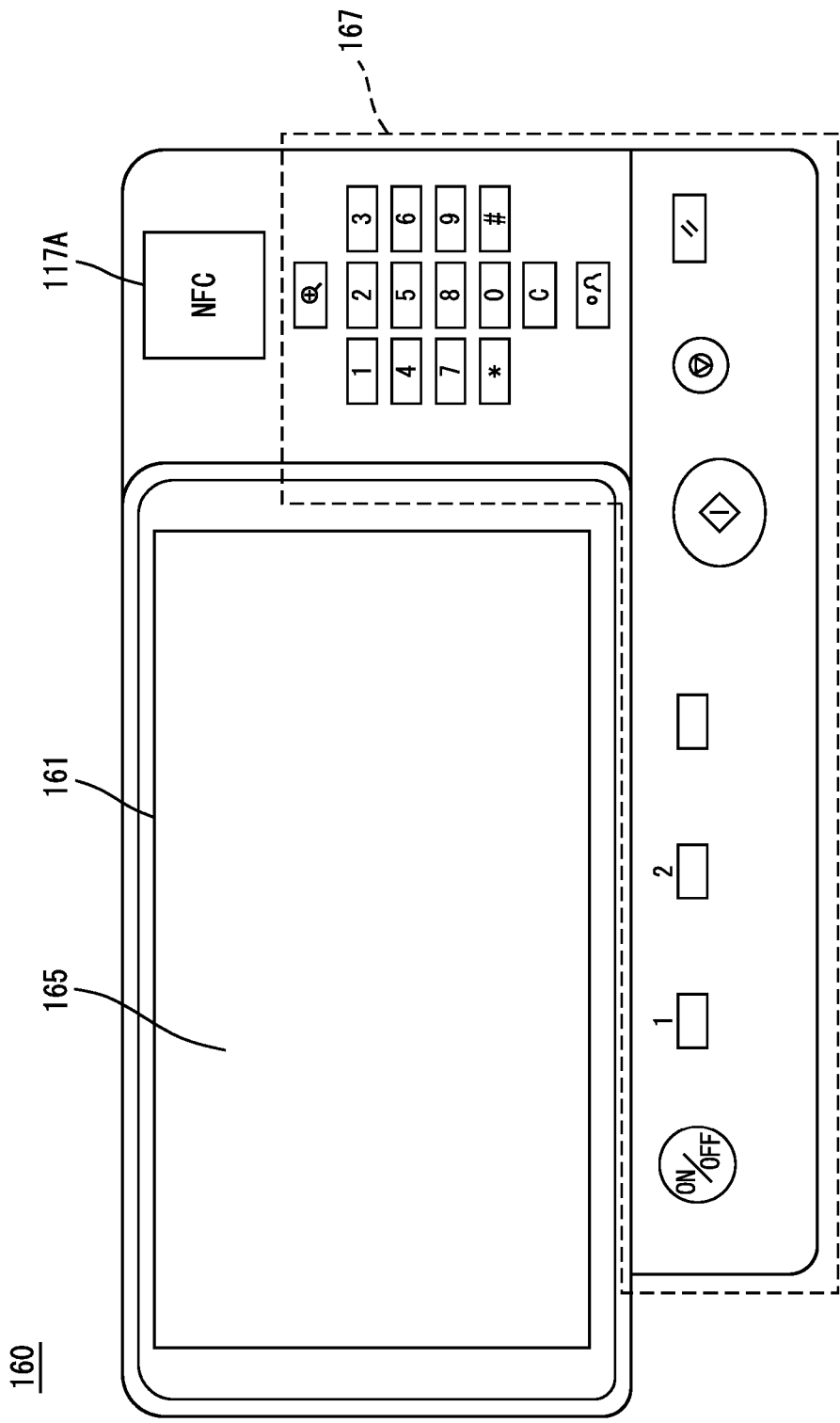
FIG. 4 is a plan view showing an example of an operation panel.

FIG. 4 is a plan view showing an example of the operation panel. Referring to FIG. 4, operation panel 160 includes a display unit 161 and an operation unit 163. The dotted line in the figure is provided to show a hard key unit 167 described later and actually does not exist. Display unit 161 is a display device such as a liquid crystal display (LCD) and an organic ELD (Electro-Luminescence Display) and displays, for example, instruction menus to users and information about the acquired image data.

Operation unit 163 includes a touch panel 165, a hard key unit 167, and a contact position notice area 117A. Touch panel 165 is superimposed on display unit 161 on the top surface or the bottom surface of display unit 161. Hard key unit 167 includes a plurality of hard keys. The hard keys are, for example, contact switches. Touch panel 165 detects the position designated by the user on the display surface of display unit 161. Contact position notice area 117A is an area indicating the position where first device-side communication unit 117 is disposed. For example, the antenna of first device-side communication unit 117 is disposed at contact position notice area 117A. Contact position notice area 117A is display for notifying the user of the position to which the user may bring portable information device 200 closer.

When operating MFP 100, the user usually stands upright. Therefore, the display surface of display unit 161, the operation surface of touch panel 165, contact position notice area 117A, and hard key unit 167 are disposed face up. This allows the user to easily view the display surface of display unit 161 and allows the user to easily points to operation unit 163 by the finger.

Figure 5:
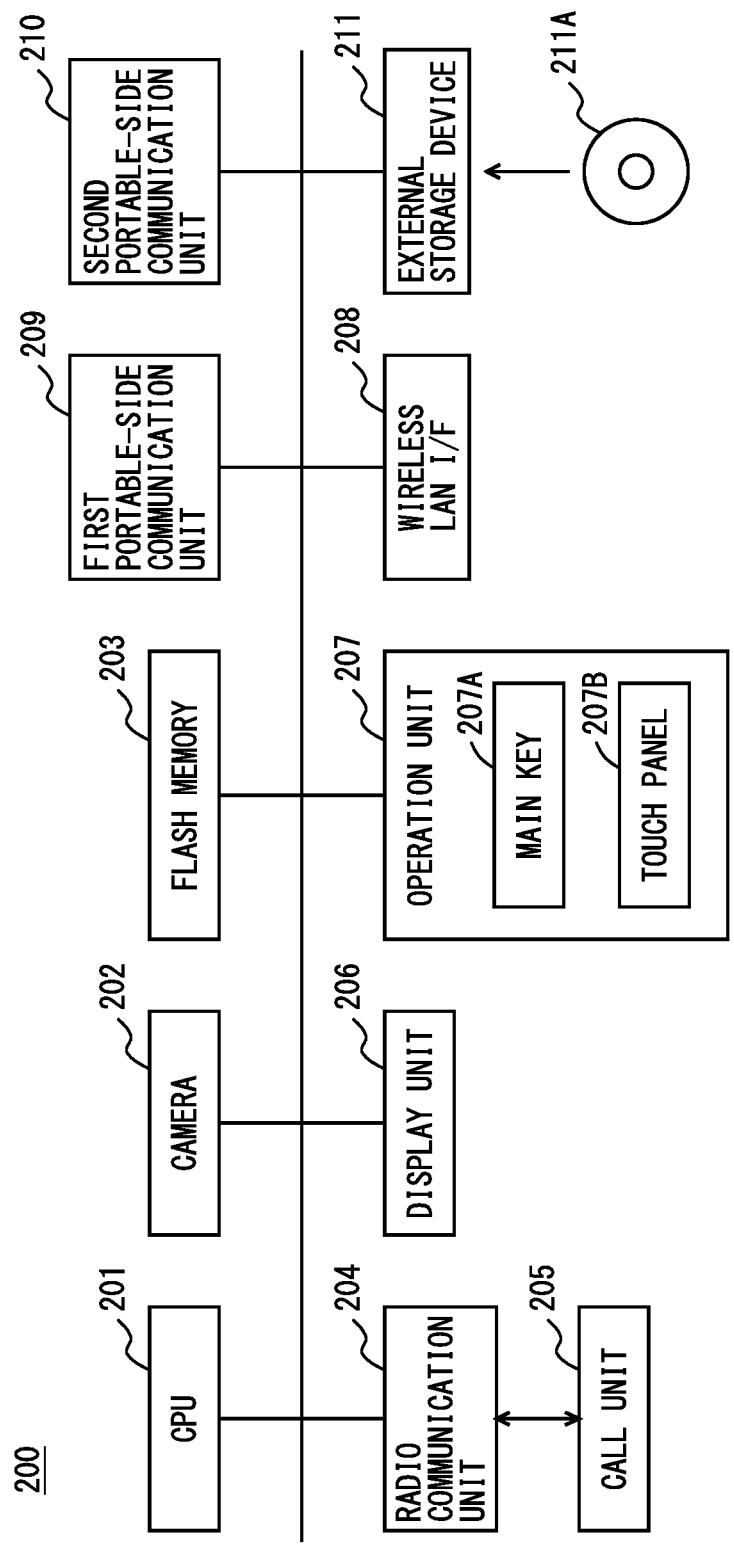
FIG. 5 is a block diagram showing the overall hardware configuration of a portable information device.

FIG. 5 is a block diagram showing the overall hardware configuration of a portable information device. Referring to FIG. 5, portable information device 200 in the present embodiment includes a CPU 201 for centrally controlling portable information device 200, a camera 202, a flash memory 203 for storing data in a nonvolatile manner, a radio communication unit 204 connected to a call unit 205, a display unit 206 displaying an image, an operation unit 207 accepting a user's operation, a wireless LAN I/F 208, a first portable-side communication unit 209, a second portable-side communication unit 210, and an external storage device 211.

Display unit 206 is a display device such as a Liquid Crystal Display) (LCD) or an organic ELD and displays, for example, instruction menus to the user and information about the acquired image data. Operation unit 207 includes a main key 207A and a touch panel 207B. When the user points to the display surface of display unit 206, operation unit 207 outputs the position of the display surface detected by touch panel 207B to CPU 201. CPU 201 detects the position designated by the user on the screen appearing on display unit 206, based on the position detected by touch panel 207B. CPU 201 accepts input of various instructions and data such as characters and numerals through the user's operation, based on the screen appearing on display unit 206 and the position detected by touch panel 207B. For example, when a screen including a ten-key image appears on display unit 206, the numeral corresponding to the key at the position detected by touch panel 207B is accepted.

Camera 202 includes a lens and an optoelectronic transducer. Light collected by the lens is imaged on the optoelectronic transducer. The optoelectronic transducer transduces the received light and outputs image data to CPU 201. The optoelectronic transducer is, for example, a CMOS (Complementary Metal Oxide Semiconductor) sensor or a CCD (Charge Coupled Device) sensor.

Radio communication unit 204 communicates by radio with a mobile phone base station connected to a telephone communication network. Radio communication unit 204 connects portable information device 200 to the telephone communication network to enable a call using call unit 205. Radio communication unit 204 decodes a voice signal obtained by demodulating a radio signal received from a mobile phone base station and outputs the decoded signal to call unit 205. Radio communication unit 204 encodes voice input from call unit 205 and transmits the encoded signal to a mobile phone base station. Call unit 205 includes a microphone and a speaker. Voice input from radio communication unit 204 is output from the speaker, and voice input from the microphone is output to radio communication unit 204. Radio communication unit 204 is controlled by CPU 201 and connects portable information device 200 to an email server to transmit/receive emails.

Wireless LAN I/F 208 is an interface for allowing portable information device 200 to perform wireless communication based on the Wi-Fi standards. The IP (Internet Protocol) address of MFP 100 is registered in portable information device 200 so that portable information device 200 can communicate with MFP 100 to transmit/receive data.

Flash memory 203 stores a program executed by CPU 201 or data necessary for executing the program. CPU 201 loads the program stored in flash memory 203 into the RAM of CPU 201 for execution. Flash memory 203 stores device identification information for identifying portable information device 200 and user identification information allocated for identifying the user allocated as a user who uses portable information device 200.

First portable-side communication unit 209 communicates with MFP 100 when the distance to MFP 100 is equal to or shorter than the first distance, based on the NFC standards.

Second portable-side communication unit 210 performs pairing with MFP 100 to perform P-to-P communication by radio, based on the Bluetooth (registered trademark) standards. Second portable-side communication unit 210 can communicate with MFP 100 when the distance to MFP 100 is equal to or shorter than the second distance.

First portable-side communication unit 209 may perform pairing with MFP 100 so that second portable-side communication unit 210 can communicate with MFP 100. The user brings portable information device 200 closer within the range of the first distance from MFP 100, so that second portable-side communication unit 210 becomes able to communicate with MFP 100. Second portable-side communication unit 210 may be an interface for wireless communication based on the Wi-Fi standards, the IrDA standards, or other standards.

External storage device 211 is removably attached to portable information device 200. A CD-ROM 211A storing a portable-side cooperation program can be attached to external storage device 211. CPU 201 can access CD-ROM 211A through external storage device 211. CPU 201 can load the portable-side cooperation program stored in CD-ROM 211A attached to external storage device 211 into the RAM of CPU 201 for execution.

The program executed by CPU 201 can be stored not only in CD-ROM 211A but also in other medium such as an optical disk (MO/MD/DVD), an IC card, an optical card, and a semiconductor memory such as a mask ROM, an EPROM, and an EEPROM.

The program recorded on flash memory 203 or CD-ROM 211A 1A has been described as a program executed by CPU 201. However, another computer connected to the Internet 5 may overwrite the program stored in flash memory 203 or additionally write a new program. Portable information device 200 may download a program from another computer connected to the Internet 5. The program herein referred to includes not only a program directly executable by CPU 201 but also a source program, a compressed program, and an encrypted program.

In cooperation system 1 in the present embodiment, portable information devices 200, 200A each communicate with MFP 100 to cooperate with MFP 100 to execute processing. In this case, portable information devices 200, 200A each specify a linked process to be executed by MFP 100 and allows MFP 100 to execute the linked process in accordance with a setting value input to each of portable information devices 200, 200A. A data transfer process will be described here, in which portable information device 200 transfers data to portable information device 200A via MFP 100. In this case, portable information device 200 allows MFP 100 to execute a first linked process, and portable information device 200A allows MFP 100 to execute a second linked process.

Specifically, the first linked process that portable information device 200 allows MFP 100 to execute is a transfer data storing process, included in the data transfer process, for storing data stored in portable information device 200. The second linked process that portable information device 200A allows MFP 100 to execute is a transfer data transmitting process, included in the data transfer process, for transmitting data received from portable information device 200 to portable information device 200A. Setting values used when MFP 100 is allowed to execute the first linked process that is the transfer data storing process include data identification information for identifying data to be transferred, device identification information of the destination of the data, and a password. Setting values used when MFP 100 is allowed to execute the second linked process that is the transfer data transmitting process include a password.

Figure 6:
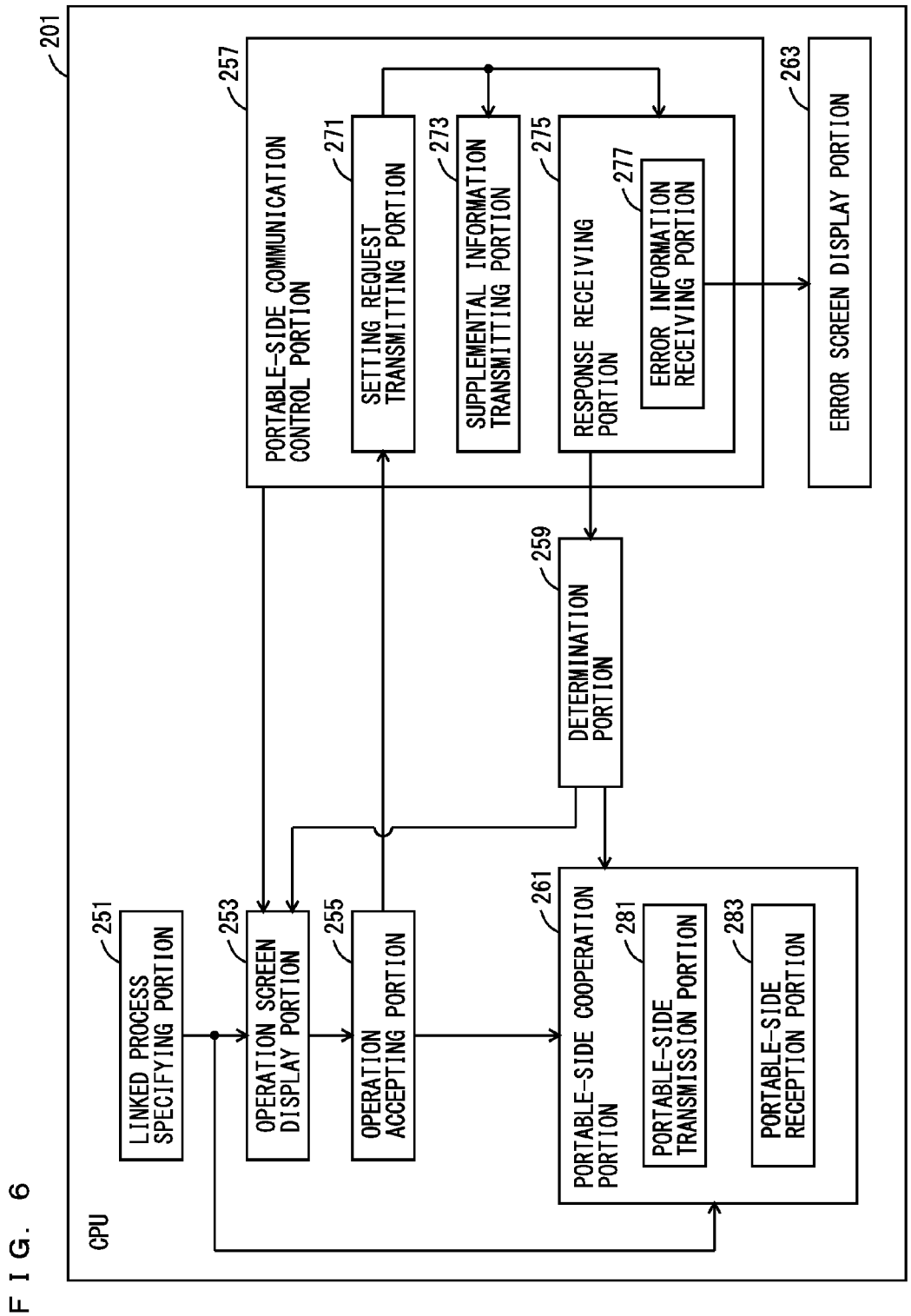
FIG. 6 is a functional block diagram showing an example of functions of the CPU of the portable information device.

FIG. 6 is a functional block diagram showing an example of functions of the CPU of the portable information device. The functions shown in FIG. 6 are formed in CPU 201 by CPU 201 of portable information device 200 executing the portable-side cooperation program. Referring to FIG. 6, CPU 201 of portable information device 200 includes a linked process specifying portion 251, an operation screen display portion 253, an operation accepting portion 255, a portable-side communication control portion 257, a determination portion 259, a portable-side cooperation portion 261, and an error screen display portion 263.

Portable-side communication control portion 257 controls wireless LAN I/F 208, first portable-side communication unit 209, and second portable-side communication unit 210. Portable-side communication control portion 257 outputs a communication state between first portable-side communication unit 209 and MFP 100 to operation screen display portion 253. First portable-side communication unit 209 becomes able to communicate with MFP 100 when portable information device 200 comes closer within the range of the first distance from MFP 100. The communication state includes a communication-in-progress state in which first portable-side communication unit 209 is able to communicate with MFP 100 and a non-communication state in which it is unable to communicate. The period from when first portable-side communication unit 209 becomes able to communicate with MFP 100 until it becomes unable to communicate is hereinafter referred to as a unit period.

Linked process specifying portion 251 specifies a linked process to be executed by MFP 100. The linked process is a process executed by MFP 100 in cooperation with portable information device 200. Linked process specifying portion 251 displays a linked process-selecting screen on display unit 206. The linked process-selecting screen includes a list of process identification information for identifying linked processes executable by MFP 100. The linked processes to be executed by MFP 100 may be preset with MFP 100. Linked process specifying portion 251 specifies one of one or more process identification information included in the linked process-selecting screen, as the process identification information of the linked process, based on the operation input to operation unit 207 by the user. Linked process specifying portion 251 outputs the process identification information of the specified linked process to operation screen display portion 253 and portable-side cooperation portion 261.

Operation screen display portion 253 displays an operation screen on display unit 206 in a state in which the non-communication state is input from portable-side communication control portion 257. The operation screen is a screen for accepting a setting value used by MFP 100 to execute the linked process specified by the process identification information input from linked process specifying portion 251 and includes an area in which a setting value is accepted. Operation screen display portion 253 displays the operation screen on display unit 206 when the non-communication state is input in a state in which the communication-in-progress state is input from portable-side communication control portion 257.

Operation accepting portion 255 accepts the setting value input to the area included in the operation screen, based on the operation input to operation unit 207 by the user in a state in which the operation screen appears on display unit 206. Operation accepting portion 255 outputs a set of the process identification information of the linked process and the accepted setting value to portable-side communication control portion 257 and portable-side cooperation portion 261.

Portable-side communication control portion 257 receives a set of the process identification information of the linked process and the setting value from operation accepting portion 255. Portable-side communication control portion 257 includes a setting request transmitting portion 271, a supplemental information transmitting portion 273, and a response receiving portion 275.

Setting request transmitting portion 271 controls first portable-side communication unit 209. After a set of the process identification information of the linked process and the setting value is input from operation accepting portion 255, setting request transmitting portion 271 makes a setting request to MFP 100 when first portable-side communication unit 209 becomes able to communicate with MFP 100. The setting request includes the device identification information of portable information device 200, the process identification information of the linked process, and the setting value. The device identification information is not specifically limited as long as portable information device 200 can be identified. For example, an IP address, a MAC address, or a domain name can be used.

Setting request transmitting portion 271 controls first portable-side communication unit 209 to transmit a setting request to MFP 100 when portable information device 200 falls within the range of the first distance to MFP 100. When transmitting a setting request, setting request transmitting portion 271 outputs the setting value to supplemental information transmitting portion 273 and outputs a reception instruction to response receiving portion 275.

When setting request transmitting portion 271 transmits the device identification information of portable information device 200 to MFP 100, portable-side communication control portion 257 controls wireless LAN I/F 208 or second portable-side communication unit 210 to establish communication with MFP 100. In this case, portable-side communication control portion 257 controls first portable-side communication unit 209 to execute a procedure for establishing communication with MFP 100 through wireless LAN I/F 208 or second portable-side communication unit 210. Portable information device 200 then becomes able to communicate with MFP 100 through wireless LAN I/F 208 or second portable-side communication unit 210. Here, second portable-side communication unit 210 becomes able to communicate with MFP 100, by way of example.

In response to input of the setting value from setting request transmitting portion 271, if there exists supplemental information associated with the setting value, supplemental information transmitting portion 273 transmits the supplemental information to MFP 100 through first portable-side communication unit 209. Supplemental information transmitting portion 273 transmits the supplemental information in a unit period including a period in which setting request transmitting portion 271 transmits a setting request. For example, if the linked process specified by linked process specifying portion 251 is a transfer data storing process, the supplemental information is a header portion of data to be transferred. If the setting value input from setting request transmitting portion 271 is data identification information of data to be transferred, supplemental information transmitting portion 273 transmits a header portion of data specified by the data identification information from among data stored in flash memory 203, to MFP 100.

After the reception instruction is input from setting request transmitting portion 271, response receiving portion 275 controls first portable-side communication unit 209 to receive a response transmitted from MFP 100 in a unit period including a period in which setting request transmitting portion 271 transmits the setting request. The response includes a response for requesting a setting value, a response indicating to start a linked process, and a response indicating that the setting value is wrong. The response indicating that the setting value is wrong includes error information. Response receiving portion 275 outputs the received response to determination portion 259. Response receiving portion 275 includes an error information receiving portion 277. When the response indicating that the setting value is wrong is received, error information receiving portion 277 outputs the error information included in the response to error screen display portion 263. The error information includes, for example, setting value type identification information indicating the type of the wrong setting value.

In response to input of the error information, error screen display portion 263 displays an error screen including a message on display unit 206 to indicate that the setting value includes an error.

Determination portion 259 receives a response from response receiving portion 275. Determination portion 259 determines the response. If the response is a response for requesting a setting value, determination portion 259 outputs setting value type identification information for identifying the type of the setting value to operation screen display portion 253. If the response is a response indicating to start a linked process, determination portion 259 outputs a start instruction to portable-side cooperation portion 261.

In response to input of the setting value type identification information from determination portion 259, operation screen display portion 253 displays an operation screen on display unit 206 for accepting the setting value of the type specified by the setting value type identification information. After the setting value type identification information is input from determination portion 259, operation screen display portion 253 displays the operation screen on display unit 206, in response to switching of the communication state input from the portable-side communication control portion 257 from the communication-in-progress state to the non-communication state.

Portable-side cooperation portion 261 receives the process identification information of the linked process from linked process specifying portion 251 and receives the setting value from operation accepting portion 255. Portable-side cooperation portion 261 includes a portable-side transmission portion 281 and a portable-side reception portion 283. If the linked process specified by the linked process identification information is a transfer data storing process, portable-side transmission portion 281 specifies the data identification information of the data to be transmitted, from among the setting values input from operation accepting portion 255, and transmits the data specified by the specified data identification information to MFP 100 through second portable-side communication unit 210, in response to input of a start instruction from determination portion 259.

If the linked process specified by the linked process identification information is a transfer data transmitting process, portable-side reception portion 283 receives data from MFP 100 through second portable-side communication unit 210 in response to input of a start instruction from determination portion 259.

Figure 7:
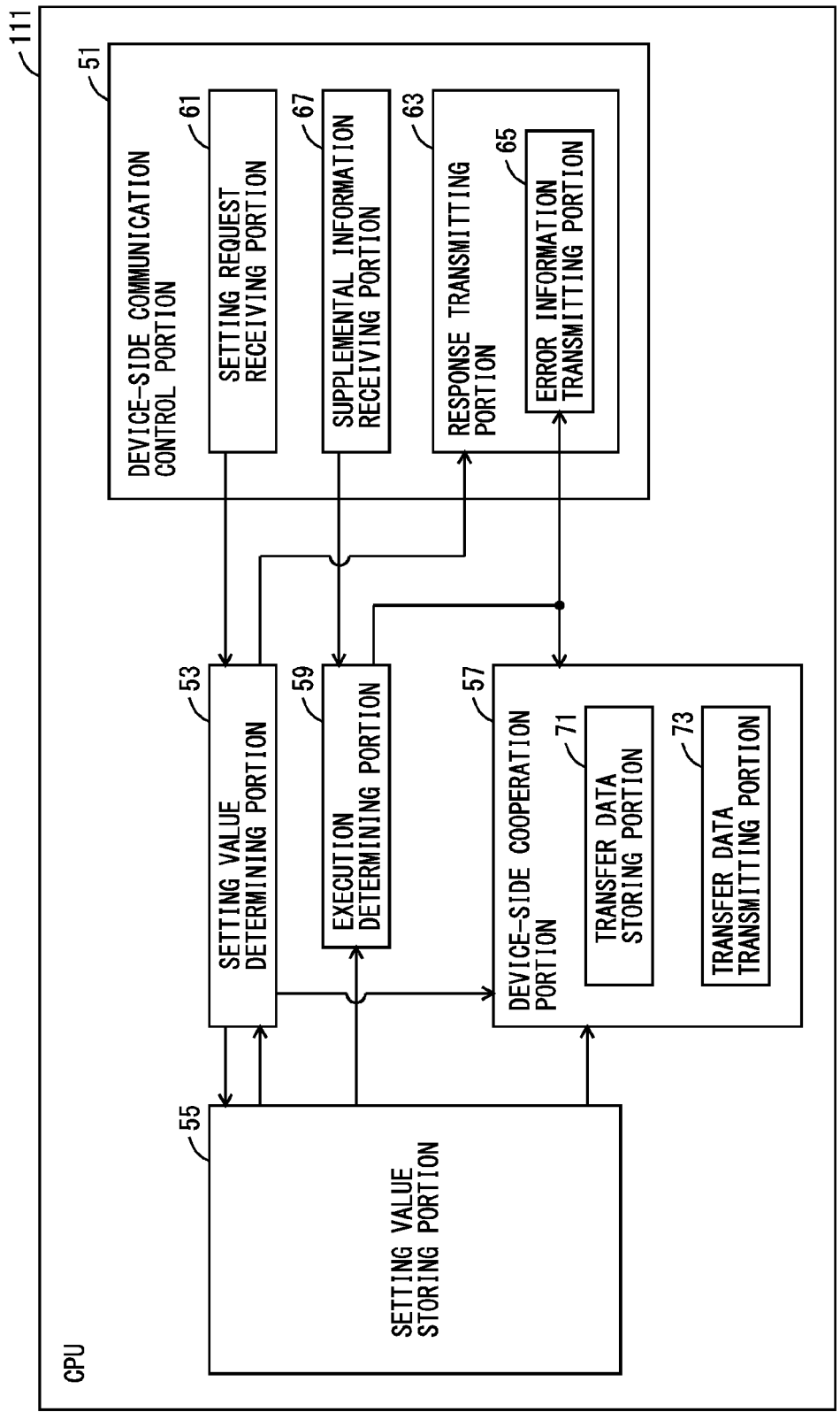
FIG. 7 is a functional block diagram showing an example of functions of the CPU of the MFP.

FIG. 7 is a functional block diagram showing an example of functions of the CPU of the MFP. The functions shown in FIG. 7 are formed in CPU 111 by CPU 111 of MFP 100 executing the device-side cooperation program. Referring to FIG. 7, CPU 111 of MFP 100 includes a device-side communication control portion 51, a setting value determining portion 53, a setting value storing portion 55, a device-side cooperation portion 57, and an execution determining portion 59.

Device-side communication control portion 51 controls communication I/F unit 112, first device-side communication unit 117, and second device-side communication unit 118. Device-side communication control portion 51 includes a setting request receiving portion 61, a supplemental information receiving portion 67, and a response transmitting portion 63. Setting request receiving portion 61 controls first device-side communication unit 117 and, when first device-side communication unit 117 becomes able to communicate with one of portable information devices 200 and 200A, receives a setting request from one of portable information devices 200 and 200A that becomes able to communicate. When a setting request is received from portable information device 200, the setting request includes the device identification information for identifying portable information device 200, the process identification information of the transfer data storing process as a linked process, and a setting value. When a setting request is received from portable information device 200A, the setting request includes the device identification information for identifying portable information device 200A, the process identification information of the transfer data transmitting process as a linked process, and a setting value. Setting request receiving portion 61 outputs the setting request acquired from portable information device 200 or portable information device 200A to setting value determining portion 53.

When setting request receiving portion 61 receives a setting request from one of portable information devices 200 and 200A, device-side communication control portion 51 controls communication I/F unit 112 or second device-side communication unit 118 to establish communication with one of portable information devices 200 and 200A that has transmitted the setting request. For example, when a setting request is received from portable information device 200, device-side communication control portion 51 controls first device-side communication unit 117 to execute a procedure for establishing communication with portable information device 200 through communication I/F unit 112 or second device-side communication unit 118. MFP 100 then becomes able to communicate with portable information device 200 through communication I/F unit 112 or second device-side communication unit 118. Here, MFP 100 becomes able to communicate with portable information device 200 through second device-side communication unit 118, by way of example. The distance at which second device-side communication unit 118 can communicate with portable information device 200 is longer than the distance at which first device-side communication unit 117 can communicate with portable information device 200. Therefore, even after the state in which first device-side communication unit 117 is able to communicate with portable information device 200 changes to the state in which it is unable to communicate, second device-side communication unit 118 can keep the state of being able to communicate with portable information device 200.

Supplemental information receiving portion 67 controls first device-side communication unit 117 to acquire supplemental information if supplemental information is received from portable information device 200 in a unit period including a period in which setting request receiving portion 61 receives the setting request. Supplemental information receiving portion 67 outputs the supplemental information received by first device-side communication unit 117 to execution determining portion 59.

In response to input of the setting request from setting request receiving portion 61, setting value determining portion 53 outputs the setting request to setting value storing portion 55. In response to input of the setting request from setting value determining portion 53, setting value storing portion 55 stores the setting request into HDD 115. Setting value determining portion 53 refers to the setting request stored by setting value storing portion 55 to determine whether all of the setting values to be used for executing the linked process specified by the process identification information included in the setting request have been received from the device specified by the device identification information included in the setting request. If it is determined that all of the setting values to be used for executing the linked process have been received, setting value determining portion 53 outputs a reception completion signal to response transmitting portion 63 and device-side cooperation portion 57. If it is determined that all of the setting values to be used for executing the linked process have not been received, setting value determining portion 53 outputs the setting value type identification information for identifying the type of the not-received setting value to response transmitting portion 63.

Execution determining portion 59 receives supplemental information from supplemental information receiving portion 67 and refers to the supplemental information and one or more setting requests stored by setting value storing portion 55 to determine whether the linked process is executable. Specifically, in the example described here, the linked process specified by the process identification information included in the setting request received from portable information device 200 is a transfer data storing process. The setting values used when the transfer data storing process is executed include data identification information for identifying data to be transferred, the device identification information of the destination of the data, and a password. Here, the device identification information of the destination of the data specifies portable information device 200A, by way of example. MFP 100 stores user data in HDD 115. The user data includes a user record for each user. The user record includes user identification information for identifying a user, device identification information of the portable information device used by the user, and group identification information for identifying a group that the user belongs to. Execution determining portion 59 analyzes the supplemental information and determines whether the data corresponding to the supplemental information is confidential data indicating that the data is open to the group and private outside the group. For example, if the header portion of the data as supplemental information includes a mark indicating that the data is confidential, that mark is detected. The mark indicating that data is confidential is, for example, a text "FOR INTERNAL USE ONLY".

Execution determining portion 59 refers to the user data based on the device identification information of portable information device 200 and the device identification information of the destination included in the setting request to determine whether the user of portable information device 200 and the user of portable information device 200A belong to the same group. If data to be transmitted is confidential data and it is determined that the user of portable information device 200 and the user of portable information device 200A do not belong to the same group, execution determining portion 59 determines that the linked process is not executable. If data to be transmitted is not confidential data, or if data to be transmitted is confidential data and the user of portable information device 200 and the user of portable information device 200A belong to the same group, execution determining portion 59 determines that the linked process is executable. If it is determined that the linked process is not executable, execution determining portion 59 outputs a not-executable signal to response transmitting portion 63 and device-side cooperation portion 57.

In response to input of setting value type identification information from setting value determining portion 53, response transmitting portion 63 controls first device-side communication unit 117 to transmit a response for requesting a setting value of the type specified by the setting value type identification information in a unit period including a period in which setting request receiving portion 61 receives the setting request. In response to a reception completion signal from setting value determining portion 53, response transmitting portion 63 controls first device-side communication unit 117 to transmit a response indicating to start a linked process in a unit period including a period in which setting request receiving portion 61 receives the setting request, on condition that a not-executable signal is not input from execution determining portion 59. Response transmitting portion 63 includes an error information transmitting portion 65. If a not-executable signal is input from execution determining portion 59, error information transmitting portion 65 controls first device-side communication unit 117 to transmit a response indicating that the setting value is wrong, in a unit period including a period in which setting request receiving portion 61 receives the setting request. The response indicating that the setting value is wrong includes error information. Here, the error information is information indicating that the device identification information that is the setting value indicating a destination is wrong, by way of example.

In response to input of a reception completion signal from setting value determining portion 53, device-side cooperation portion 57 executes the linked process on condition that a not-executable signal is not input from execution determining portion 59. Device-side cooperation portion 57 includes a transfer data storing portion 71 and a transfer data transmitting portion 73. If the linked process specified by the process identification information included in the setting request received from the portable information device 200 indicates a transfer data storing process, transfer data storing portion 71 receives data from portable information device 200 through second device-side communication unit 118 in response to input of the reception completion signal from setting value determining portion 53. Transfer data storing portion 71 adds the data identification information included in the setting request to the data received from portable information device 200 and stores the data into HDD 115 in association with the device identification information of the destination and the password included in the setting request.

If the linked process specified by the process identification information included in the setting request received from portable information device 200A indicates a transfer data storing process, transfer data transmitting portion 73 transmits data associated with the device identification information of portable information device 200A, from among data stored in HDD 115, to portable information device 200A through second device-side communication unit 118, in response to input of the reception completion signal from setting value determining portion 53, on condition that the password associated with the data agrees with the password included in the setting request received from portable information device 200A.

Figure 8:
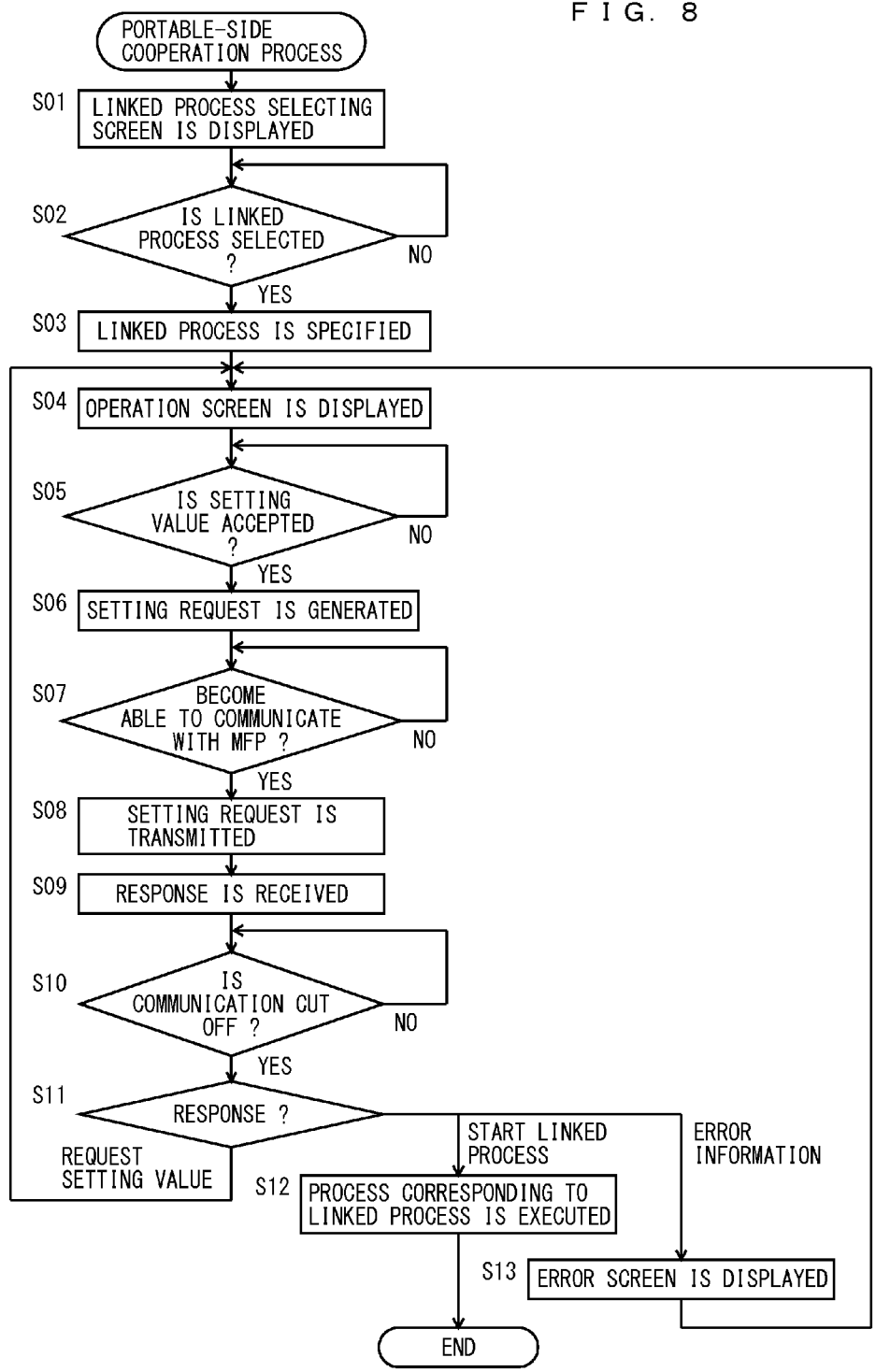
FIG. 8 is a flowchart showing an example of a portable-side cooperation process.

FIG. 8 is a flowchart showing an example of a portable-side cooperation process. The portable-side cooperation process is a process executed by CPU 201 by CPU 201 of each of portable information devices 200, 200A executing the portable-side cooperation program. Here, the portable-side cooperation process performed when CPU 201 of portable information device 200 executes the portable-side cooperation program will be described, by way of example. Referring to FIG. 8, CPU 201 displays a linked process-selecting screen on display unit 206 (step S01). The linked process-selecting screen includes a list of process identification information for identifying linked processes executable by MFP 100.

In the next step S02, it is determined whether a selection of a linked process is accepted. The process waits until a selection of a linked process is accepted (NO in step S02). If a selection of a linked process is accepted (YES in step S02), the process proceeds to step S03. If the user inputs to operation unit 207 the operation of selecting one of one or more process identification information included in the list, the selection of the linked process is accepted. The linked process specified by the process identification information selected by the user is specified as a linked process to be executed by MFP 100 (step S03).

In the next step S04, an operation screen is displayed on display unit 206. The operation screen is a screen for accepting a setting value used by MFP 100 to execute the linked process specified in step S03 and includes an area in which a setting value is accepted. If there are a plurality of setting values used by MFP 100 to execute the linked process specified in step S03, a setting screen for accepting any one of the setting values may be displayed.

In the next step S05, the process waits until a setting value is accepted (NO in step S05). If a setting value is accepted, the process proceeds to step S06.

In the next step S06, a setting request is generated. The setting request includes the device identification information of portable information device 200, the process identification information of the linked process specified in step S03, and the setting value accepted in step S05. It is then determined whether first portable-side communication unit 209 becomes able to communicate with MFP 100 (step S07). The process waits until first portable-side communication unit 209 becomes able to communicate with MFP 100 (NO in step S07). When first portable-side communication unit 209 becomes able to communicate with MFP 100 (YES in step S07), the process proceeds to step S08.

In step S08, the setting request generated in step S06 is transmitted to MFP 100 through first portable-side communication unit 209, and the process proceeds to step S09. In step S09, first portable-side communication unit 209 is controlled to receive a response returned by MFP 100. The response includes a response for requesting a setting value, a response indicating to start a linked process, and a response indicating that the setting value is wrong.

In the next step S10, it is determined whether the communication with MFP 100 is cut off. It is determined that the communication is cut off if first portable-side communication unit 209 becomes unable to communicate with MFP 100. The process waits until the communication with MFP 100 is cut off (NO in step S10). If the communication with MFP 100 is cut off, the process proceeds to step S11.

In step S11, the process branches depending on the response received in step S09. If the response is a response for requesting a setting value, the process returns to step S04. If the response is a response indicating to start a linked process, the process proceeds to step S12. If the response is a response indicating that the setting value is wrong and including error information, the process proceeds to step S13. In step S04, if the process proceeds from step S11, an operation screen is displayed on display unit 206 for accepting a setting value of the type specified by the setting value type identification information included in the response.

In step S12, the process set as a process executed in portable information 200 corresponding to the linked process specified in step S03 is executed. The process then ends. For example, if the linked process is a transfer data storing process, the process set as a process executed in portable information device 200 corresponding to the transfer data storing process is a process of transmitting data to MFP 100. If the linked process is a transfer data transmitting process, the process set as a process executed in portable information device 200 corresponding to the transfer data transmitting process is a process of receiving and storing data transmitted from MFP 100.

In step S13, an error screen is displayed on display unit 206, and the process returns to step S04. In step S04, if the process proceeds from step S13, an operation screen is displayed on display unit 206 for accepting a setting value of the type specified by the setting value type identification information for identifying the type of the wrong setting value included in the response.

FIG. 9 is a flowchart showing an example of the procedure of a device-side cooperation process. The device-side cooperation process is a process executed by CPU 111 by CPU 111 of MFP 100 executing a device-side cooperation program. Referring to FIG. 9, CPU 111 determines whether first device-side communication unit 117 becomes able to communicate with one of portable information devices 200 and 200A (step S21). The process waits until first device-side communication unit 117 becomes able to communicate with one of portable information devices 200 and 200A (NO in step S21). When first device-side communication unit 117 becomes able to communicate with one of portable information devices 200 and 200A (YES in step S21), the process proceeds to step S22. Here, first device-side communication unit 117 becomes able to communicate with portable information device 200, by way of example.

In step S22, first device-side communication unit 117 is controlled to receive a setting request from portable information device 200. The received setting request is then stored into HDD 115 (step S23). The setting request includes the device identification information of portable information device 200, the process identification information of a linked process, and a setting value.

In the next step S24, the setting value is determined. Specifically, it is determined whether to request a setting value to be used in the linked process specified by the process identification information included in the setting request received in step S22. From among the setting requests stored in HDD 115, the setting request having the same device identification information and process identification information as those included in the setting request received in step S22 is extracted, and a setting value included in the extracted one or more setting requests is specified. It is determined whether the specified one or more setting values are all of the one or more setting values to be used in the linked process specified by the process identification information included in the setting request received in step S22. If all of the one or more setting values to be used in the linked process are specified, it is determined not to request a setting value. If all of the one or more setting values to be used in the linked process are not specified, it is determined to request a setting value.

The process then branches based on the determination result (step S25). If the determination result indicates requesting a setting value, the process proceeds to step S26. If not, the process proceeds to step S28. In step S26, first device-side communication unit 117 is controlled to transmit a response for requesting a setting value to portable information device 200. In the next step S27, it is determined whether communication with portable information device 200 is cut off in first device-side communication unit 117. The process waits until communication with portable information device 200 is cut off in first device-side communication unit 117 (NO in step S27). If communication with portable information device 200 is cut off in first device-side communication unit 117 (YES in step S27), the process returns to step S21.

In step S28, whether to execute or not is determined. When the process proceeds to step S28, one or more setting requests that include all of the one or more setting values to be used in the linked process specified by the process identification information included in the setting request received in step S22 have been stored in HDD 115. In step S28, it is determined whether the linked process specified by the process identification information included in the setting request is executable using the one or more setting values included in the one or more setting requests stored in HDD 115.

In the next step S29, if the result of determination as to whether to execute indicates that the process is executable, the process proceeds to step S30. If not, the process proceeds to step S32. In step S30, a response indicating to start the linked process is transmitted to portable information device 200 through first device-side communication unit 117, and the process proceeds to step S31. In step S31, the linked process specified by the process identification information included in the setting request is executed, and the process ends. For example, if the linked process is a transfer data storing process, data transmitted from portable information device 200 is received, and data including data identification information as a setting value added to the received data is stored into HDD 115 in association with the device identification information of the destination as a setting value. If the linked process is a transfer data transmitting process, data associated with the same device identification information as the device identification information included in the setting request is transmitted to the device specified by the device identification information included in the setting request, on condition that the password associated with the data is the same as the password that is the setting value included in the setting request.

In step S32, a response including error information is transmitted to portable information device 200, and the process returns to step S21.

FIG. 10 is a diagram showing an example of the procedure of a cooperation process. Referring to FIG. 10, the time flows from top to bottom, and the flow of information communicated between portable information devices 200, 200A and MFP 100 is shown in chronological order. Here, portable information device 200 is denoted by "portable information device A", portable information device 200A is denoted by "portable information device B", and MFP 100 is denoted by "MFP". In portable information device 200, a transfer data storing process is designated as a linked process to be executed by MFP 100. In portable information device 200A, a transfer data transmitting process is designated as a linked process to be executed by MFP 100.

First of all, at portable information device 200, a transfer data storing process is accepted as a linked process. The data identification information of data to be transmitted is accepted as a setting value. Portable information device 200 accepting the data identification information transmits a setting request to MFP 100 when first portable-side communication unit 117 becomes able to communicate with MFP 100, in other words, when the user brings portable information device 200 ten and several centimeters closer to contact position notice area 117A of operation panel 160 of MFP 100. This setting request includes the device identification information of portable information device 200, the process identification information of the transfer data storing process, and the data identification information of data to be transmitted.

MFP 100 receiving the setting request stores the setting request and determines whether to request a setting value for executing the linked process. The setting values for executing the transfer data storing process include the data identification information of data to be transmitted, the device identification information of the destination, and a password. In this stage, only the data identification information has been received, and the device identification information and the password have not yet been received. Therefore, a response for requesting a setting value is returned to portable information device 200. The response in this case includes setting value type identification information indicating the type of the requested setting value.

After receiving the response for requesting a setting value from MFP 100, portable information device 200 displays an operation screen for accepting the device identification information of the destination device as a setting value of the type specified by the setting value type identification information, when first portable-side communication unit 117 becomes unable to communicate with MFP 100, in other words, when the user brings portable information device 200 ten and a few centimeters or further away from contact position notice area 117A of operation panel 160 of MFP 100. The device identification information of the destination input to operation unit 207 by the user is accepted. Here, the device identification information of portable information device 200A is accepted as the device identification information of the destination, by way of example.

Portable information device 200 accepting the device identification information transmits a setting request to MFP 100 when first portable-side communication unit 117 becomes able to communicate with MFP 100, in other words, when the user brings portable information device 200 ten and a few centimeters closer to contact position notice area 117A of operation panel 160 of MFP 100. This setting request includes the device identification information of portable information device 200, the process identification information of the transfer data storing process, and the device identification information of portable information device 200A as a destination.

MFP 100 receiving the setting request stores the setting request and determines whether to request a setting value for executing a linked process. In this stage, only the data identification information and the device identification information of the destination have been received, and a password has not yet been received. Therefore, a response for requesting a setting value is returned to portable information device 200. The response in this case includes the setting value type identification information indicating the type of the requested setting value.

After receiving the response for requesting a setting value from MFP 100, portable information device 200 displays an operation screen for accepting a password as a setting value of the type specified by the setting value type identification information, when first portable-side communication unit 117 becomes unable to communicate with MFP 100, in other words, when the user brings portable information device 200 ten and several centimeters or further away from contact position notice area 117A of operation panel 160 of MFP 100. The password input to operation unit 207 by the user is then accepted.

The portable information device 200 accepting the password transmits a setting request to MFP 100 when first portable-side communication unit 117 becomes able to communicate with MFP 100, in other words, when the user brings portable information device 200 ten and several centimeters closer to contact position notice area 117A of operation panel 160 of MFP 100. This setting request includes the device identification information of portable information device 200, the process identification information of the transfer data storing process, and the password.

MFP 100 receiving the setting request stores the setting request and determines whether to request a setting value for executing the linked process. In this stage, the data identification information, the device identification information of the destination, and the password have been received, and all of the setting values to be used in the transfer data storing process have been received. Therefore, a response indicating to start the linked process is returned to portable information device 200, and the linked process is executed.

After receiving the response indicating to start the linked process from MFP 100, portable information device 200 executes a process corresponding to the transfer data storing process that is a linked process. Specifically, data specified by the data identification information designated as data for the linked process is read from flash memory 203 and transmitted to MFP 100. At MFP 100, a transfer data storing process that is a linked process is executed. Specifically, MFP 100 executes a transfer data storing process to receive data transmitted by portable information device 200 and store the received data in HDD 115 in association with the device identification information of the destination portable information device 200A and the password as setting values.

At portable information device 200A, the transfer data transmitting process is accepted as a linked process. The password is then accepted as a setting value. Portable information device 200A accepting the password transmits a setting request to MFP 100 when first portable-side communication unit 117 becomes able to communicate with MFP 100, in other words, when the user brings portable information device 200A ten and a few centimeters closer to contact position notice area 117A of operation panel 160 of MFP 100. This setting request includes the device identification information of portable information device 200A, the process identification information of the transfer data transmitting process, and the password accepted as a setting value.

MFP 100 receiving the setting request stores the setting request and determines whether to request a setting value for executing the linked process. The setting value for executing a transfer data transmitting process includes a password. In this stage, the password has been received, and all the setting value to be used for the transfer data transmitting process has been received. Therefore, a response indicating to start the linked process is returned to portable information device 200A, and the linked process is executed. Specifically, MFP 100 executes the transfer data transmitting process to extract data associated with the device identification information included in the setting request from among data stored in HDD 115 and transmits the extracted data to portable information device 200A on condition that the password associated with the extracted data agrees with the password included in the setting request.

After receiving the response indicating to start the linked process from MFP 100, portable information device 200A executes a process corresponding to the transfer data transmitting process as a linked process. Specifically, data transmitted from MFP 100 is received and stored into flash memory 203.

As described above, in cooperation system 1 in the present embodiment, data is communicated between portable information devices 200 and 200A through MFP 100. Portable information devices 200, 200A each include first portable-side communication unit 117 that is able to communicate with MFP 100 within a range of the first distance. In a state in which first portable-side communication unit 117 is unable to communicate with MFP 100, in other words, in a state in which portable information devices 200, 200A are at the first distance or further from MFP 100, an operation screen is displayed. After a setting value input by the user is accepted, a setting request is transmitted when first portable-side communication unit 117 becomes able to communicate with MFP 100, in other words, in response to portable information devices 200, 200A coming closer to the distance within the first distance from MFP 100. When a response received from MFP 100 after transmitting the setting request to MFP 100 requests a setting value, portable information devices 200, 200A each display an operation screen for setting a setting value, in response to termination of the communication period in which the response is received, in other words, in response to portable information devices 200, 200A coming away from MFP 100 at the first distance or further. In response to becoming able to communicate with one of portable information devices 200, 200A, MFP 100 receives a setting request from the access device in a communication period in which it is able to communicate with the access device that become able to communicate, and determines whether all of the one or more setting values to be used in the linked process specified by the process identification information included in the setting request have been received. If it is determined that all of the one or more setting values have not been received, a response for requesting a setting value is returned to the access device. If it is determined that all of the one or more setting values have been received, a response indicating to start the linked process is returned to the access device, and the linked process is executed. The user thus can set a setting value in MFP 100 to execute a linked process through the operation of inputting a setting value, for example, in portable information device 200 and bringing portable information device 200 closer within the first distance to MFP 100.

For example, when a response received from MFP 100 after transmitting the setting request including the process identification information of the transfer data storing process as a linked process to MFP 100 indicates to start the linked process, portable information device 200 transmits data to MFP 100. MFP 100 executes the transfer data storing process to receive the data transmitted from portable information device 200 and stores the data in association with the device identification information of portable information device 200A. When a response received from MFP 100 after transmitting the setting request including the process identification information of the transfer data transmitting process as a linked process to MFP 100 indicates to start the linked process, MFP 100 executes the transfer data transmitting process to transmit the data received from portable information device 200 to portable information device 200A. Portable information device 200A then receives the data transmitted from MFP 100. The user thus can easily perform the process of allowing MFP 100 to receive and store data by operating portable information device 200 and perform the process of allowing MFP 100 to transmit data by operating portable information device 200A. Data can be transferred from portable information device 200 to portable information device 200A through MFP 100.

MFP 100 transmits the data received from portable information device 200 to portable information device 200A on condition that the same password as the password associated with the data received from portable information device 200 is received from portable information device 200A. The security of data is thus ensured because data stored in portable information device 200 is transmitted to portable information device 200A when the user who knows the password input to portable information device 200 operates portable information device 200A.

When data identification information is transmitted as a setting value to MFP 100, portable information device 200 transmits supplemental information added to the data to be processed to MFP 100. When the response received from MFP 100 in response to transmission of the supplemental information indicates that the setting value is wrong, portable information device 200 notifies the user that the setting value is wrong. At MFP 100, it is determined whether data can be transmitted to the destination portable information device 200, based on the supplemental information and the device identification information received as a setting value. If it is determined that data cannot be transmitted, the response indicating that the setting value is wrong is returned to portable information device 200. This processing can reduce errors in setting a data destination at portable information device 200.

At MFP 100, it is determined whether all of the one or more setting values to be used in the linked process exist, based on the setting value stored together with the device identification information and the process identification information included in the setting request. Since whether the setting values have been set is determined at MFP 100 that executes the linked process, the setting values necessary for executing the linked process can be set at portable information devices 200, 200A.

In the foregoing embodiment, cooperation system 1 that includes MFP 100 as an example of the image processing apparatus and portable information devices 200, 200A as an example of the portable information device has been described. However, it is needless to say that the present invention can be understood as a cooperation method that allows each portable information device 200 to execute the portable-side cooperation process shown in FIG. 8 and allows MFP 100 to execute the device-side cooperation process shown in FIG. 9.

Although the present invention has been described and illustrated in detail, it is clearly understood that the same is by way of illustration and example only and is not to be taken by way of limitation, the spirit and scope of the present invention being limited only by the terms of the appended claims.

What is claimed is:
1. A cooperation system in which data is transmitted/received between a plurality of portable information devices through an image processing apparatus,
   the plurality of portable information devices each comprising:
   a portable-side communication unit to communicate with the image processing apparatus within a range of a predetermined distance, and
   a portable-side control unit,
   the portable-side control unit configured to execute:
   a linked process specifying step of specifying a linked process to be executed by the image processing apparatus between the image processing apparatus and the portable information device;
   an operation screen display step of displaying on a display device an operation screen for accepting a setting value corresponding to the specified linked process, in response to the portable-side communication unit entering a state in which the portable-side communication unit is unable to communicate with the image processing apparatus;
   an operation accepting step of accepting a setting value input by a user in a state in which the operation screen is displayed while the portable-side communication unit is unable to communicate with the image processing apparatus;
   a portable-side communication control step of, in response to the portable-side communication unit becoming able to communicate with the image processing apparatus after an operation is accepted in the operation accepting step, automatically transmitting a setting request including device identification information for identifying the portable information device, process identification information for identifying the linked process to be executed by the image processing apparatus, and the accepted setting value, and receiving a response to the setting request from the image processing apparatus, in a communication period in which the portable-side communication unit is able to communicate with the image processing apparatus;
   a portable-side cooperation step of, when the response received in the portable-side communication control step indicates to start the linked process, transmitting/receiving data in cooperation with the image processing apparatus; and
   a step of, when the response received in the portable-side communication control step requests a setting value, displaying an operation screen for setting the requested setting value, in response to termination of the com- munication period in which the portable-side communication unit receives the response from the image processing apparatus, the image processing apparatus comprising:

a device-side communication unit to communicate with the portable-side communication unit of each of the plurality of portable information devices, and a device-side control unit, the device-side control unit configured to execute:

a device-side communication control step of, in response to the device-side communication unit becoming able to communicate with one of the plurality of portable information devices, receiving a setting request from an access device and returning a response corresponding to the setting request to the access device in a communication period in which the device-side communication unit is able to communicate with the access device, the access device being one of the plurality of portable information devices that the device-side communication unit becomes able to communicate with;

a setting value determining step of determining whether all of one or more setting values to be used in the linked process specified by process identification information included in the setting request received in the device-side communication control step have been received;

a device-side cooperation step of, when it is determined that all of the one or more setting values have been received in the setting value determining step, in response to the setting request being received, executing the linked process specified by the process identification information included in the setting request received by the device-side control unit based on the accepted setting value; and a response transmitting step of, when it is determined that all of the one or more setting values have not been received in the setting value determining step, in response to the setting request being received, returning to the access device a response for requesting the not-received setting value among the one or more setting values to be used in the linked process and, thereafter when it is determined that all of the one or more setting values have been received in the setting valve determining step, returning a response indicating to start the linked process to the access device, the device-side cooperation step including a device-side transmitting/receiving step of transmitting/receiving data in cooperation with the access device, and wherein the termination of the communication period occurs in response to the portable information device becoming outside the range of the predetermined distance.

2. The cooperation system according to claim 1, wherein the portable-side communication control step includes:

a portable-side transmission step of transmitting data to the image processing apparatus, when the linked process is a transfer data storing process of storing data, and a portable-side reception step of receiving data from the image processing apparatus, when the linked process is a transfer data transmitting process of transmitting stored data, and the device-side cooperation step includes:

a transfer data storing step of receiving data from a first portable information device of the plurality of portable information devices and storing in a storage device the received data, and a transfer data transmitting step of transmitting data received from the first portable information device to a second portable information device of the plurality of portable information devices.

3. The cooperation system according to claim 2, wherein setting values to be used in the transfer data storing process include data identification information for identifying data, device identification information for identifying a destination device to which data is transmitted among the plurality of portable information devices, and a password indicating a condition for transmitting the data, setting values to be used in the transfer data transmitting process include a password, the transfer data storing step includes a step of storing in said storage device data received from the first portable information device in association with a password received from the first portable information device, and the transfer data transmitting step includes a step of transmitting the data received from the first portable information device to the second portable information device on condition that same password as the password associated with the data received from the first portable information device is received from the second portable information device.

4. The cooperation system according to claim 3, wherein the portable-side communication control step includes:

a supplemental information transmitting step of transmitting supplemental information added to data to be processed, when the data identification information is transmitted as the setting value, and a notification step of, when a response received in response to transmission of the supplemental information indicates that the setting value is wrong, notifying a user that the setting value is wrong, the device-side communication control step further includes:

a supplemental information receiving step of, when a setting request including the data identification information as the setting value is received, receiving the supplemental information, and a transmission determining step of determining whether data can be transmitted to the portable information device specified by the device identification information among the plurality of portable information devices, based on the received supplemental information and the device identification information received as the setting value, and the response transmitting step includes an error information transmitting step of, when it is determined that data cannot be transmitted, returning a response indicating that the setting value is wrong to the access device.

5. The cooperation system according to claim 1, wherein the setting value determining step includes:

a setting value storing step of storing in a storage device the device identification information, the process identification information, and the setting value included in the setting request, and a step of determining whether all of one or more setting values to be used in the linked process exist, based on the setting value stored together with the device identification information and the process identification information included in the setting request in the setting value storing step.

6. A cooperation system executed in an image processing apparatus and a portable information device configured to communicate with the image processing apparatus, the portable information device comprising:
a portable-side communication unit to communicate with the image processing apparatus within a range of a predetermined distance, and
a portable-side controller,
the portable-side controller configured to execute:
a linked process specifying step of specifying a linked process to be executed by the image processing apparatus between the image processing apparatus and the portable information device;
an operation screen display step of displaying on a display device an operation screen for accepting a setting value corresponding to the specified linked process, in response to the portable-side communication unit entering a state in which the portable-side communication unit is unable to communicate with the image processing apparatus, the setting value being configured to be used by the image processing apparatus to execute the linked process;
an operation accepting step of accepting a setting value input by a user in a state in which the operation screen is displayed while the portable-side communication unit is unable to communicate with the image processing apparatus;
a portable-side communication control step of, in response to the portable-side communication unit becoming able to communicate with the image processing apparatus after an operation is accepted in the operation accepting step, automatically transmitting a setting request including device identification information for identifying the portable information device, process identification information for identifying the linked process, and the accepted setting value, and receiving a response to the setting request from the image processing apparatus, in a communication period in which the portable-side communication unit is able to communicate with the image processing apparatus; and
a step of, when the response received in the portable-side communication control step requests a setting value, displaying an operation screen for setting the setting value requested by the received response, in response to termination of the communication period in which the portable-side communication unit receives the response from the image processing apparatus,
the image processing apparatus comprising:
a device-side communication unit to communicate with the portable-side communication unit of the portable information device, and
a device-side controller,
the device-side controller configured to execute:
a device-side communication control step of, in response to the device-side communication unit becoming able to communicate with the portable information device, receiving a setting request from the portable information device and returning a response to the setting request to the portable information device, in a communication period in which the device-side communication unit is able to communicate with the portable information device;
a setting value determining step of determining whether all of one or more setting values to be used in the linked process specified by the process identification information included in the setting request received in the device-side communication control step have been received; and
a device-side cooperation step of, when it is determined that all of the one or more setting values have been received in the setting value determining step, executing the linked process specified by the process identification information included in the setting request received in the device-side communication control step,
the device-side communication control step including a response transmitting step of, when it is determined that all of the one or more setting values have not been received in the setting value determining step, in response to the setting request being received, returning a response for requesting transmission of the not-received setting value of the one or more setting values to be used in the linked process to the portable information device, and
wherein the termination of the communication period occurs in response to the portable information device becoming outside the range of the predetermined distance.

7. A cooperation method performed in a cooperation system in which data is transmitted/received between a plurality of portable information devices through an image processing apparatus, the plurality of portable information devices each comprising:
a portable-side communication unit to communicate with the image processing apparatus within a range of a predetermined distance, and
a portable-side control unit,
the cooperation method allowing the portable-side control unit to execute:
a linked process specifying step of specifying a linked process to be executed by the image processing apparatus between the image processing apparatus and the portable information device;
an operation screen display step of displaying on a display device an operation screen for accepting a setting value corresponding to the specified linked process, in response to the portable-side communication unit entering a state in which the portable-side communication unit is unable to communicate with the image processing apparatus, the setting value being configured to be used by the image processing apparatus to execute the linked process;
an operation accepting step of accepting a setting value input by a user in a state in which the operation screen is displayed while the portable-side communication unit is unable to communicate with the image processing apparatus;
a portable-side communication control step of, in response to the portable-side communication unit becoming able to communicate with the image processing apparatus after an operation is accepted in the operation accepting step, automatically transmitting a setting request including device identification information for identifying the portable information device, process identification information for identifying the linked process to be executed by the image processing apparatus, and the accepted setting value, and receiving a response to the setting request from the image processing apparatus, in a communication period in which the portable-side communication unit is able to communicate with the image processing apparatus;

a portable-side cooperation step of, when the response received in the portable-side communication control step indicates to start the linked process, transmitting/receiving data in cooperation with the image processing apparatus; and a step of, when the response received in the portable-side communication control step requests a setting value, displaying an operation screen for setting the requested setting value, in response to termination of the communication period in which the portable-side communication unit receives the response from the image processing apparatus, the image processing apparatus comprising:

a device-side communication unit to communicate with the portable-side communication unit of each of the plurality of portable information devices, and a device-side control unit, the cooperation method allowing the device-side control unit to execute:

a device-side communication control step of, in response to the device-side communication unit becoming able to communicate with one of the plurality of portable information devices, receiving a setting request from an access device and returning a response corresponding to the setting request to the access device in a communication period in which the device-side communication unit is able to communicate with the access device, the access device being one of the plurality of portable information devices that the device-side communication unit becomes able to communicate with;

a setting value determining step of determining whether all of one or more setting values to be used in the linked process specified by process identification information included in the setting request received in the device-side communication control step have been received;

a device-side cooperation step of, when it is determined that all of the one or more setting values have been received in the setting value determining step, in response to the setting request being received, executing the linked process specified by the process identification information included in the setting request received by the device-side control unit; and a response transmitting step of, when it is determined that all of the one or more setting values have not been received in the setting value determining step, in response to the setting request being received, returning to the access device a response for requesting the not-received setting value among the one or more setting values to be used in the linked process and, thereafter when it is determined that all of the one or more setting values have been received in the setting valve determining step, returning a response indicating to start the linked process to the access device, the device-side cooperation step including a device-side transmitting/receiving step of transmitting/receiving data in cooperation with the access device, and wherein the termination of the communication period occurs in response to the portable information device becoming outside the range of the predetermined distance.

8. A cooperation method performed in an image processing apparatus and a portable information device configured to communicate with the image processing apparatus, the portable information device comprising:

a portable-side communication unit to communicate with the image processing apparatus within a range of a predetermined distance, and a portable-side controller, the cooperation method allowing the portable-side controller to execute:

a linked process step of specifying a linked process to be executed by the image processing apparatus between the image processing apparatus and the portable information device;

an operation screen display step of displaying on a display device an operation screen for accepting a setting value corresponding to the specified linked process, in response to the portable-side communication unit entering a state in which the portable-side communication unit is unable to communicate with the image processing apparatus, the setting value being configured to be used by the image processing apparatus to execute the linked process;

an operation accepting step of accepting a setting value input by a user in a state in which the operation screen is displayed while the portable-side communication unit is unable to communicate with the image processing apparatus;

a portable-side communication control step of, in response to the portable-side communication unit becoming able to communicate with the image processing apparatus after an operation is accepted in the operation accepting step, automatically transmitting a setting request including device identification information for identifying the portable information device, process identification information for identifying the linked process, and the accepted setting value, and receiving a response to the setting request from the image processing apparatus, in a communication period in which the portable-side communication unit is able to communicate with the image processing apparatus; and a step of, when the response received in the portable-side communication control step requests a setting value, displaying an operation screen for setting the setting value requested by the received response, in response to termination of the communication period in which the portable-side communication unit receives the response from the image processing apparatus, the image processing apparatus comprising:

a device-side communication unit to communicate with the portable-side communication unit of the portable information device, and a device-side controller, the cooperation method allowing the device-side controller to execute:

a device-side communication control step of, in response to the device-side communication unit becoming able to communicate with the portable information device, receiving a setting request from the portable information device and returning a response to the setting request to the portable information device, in a communication period in which the device-side communication unit is able to communicate with the portable information device;

a setting value determining step of determining whether all of one or more setting values to be used in the linked process specified by the process identification information included in the setting request received in the device-side communication control step have been received; and a device-side cooperation step of, when it is determined that all of the one or more setting values have been received in the setting value determining step, executing the linked process specified by the process identification information included in the setting request received in the device-side communication control step, the device-side communication control step including a response transmitting step of, when it is determined that all of the one or more setting values have not been received in the setting value determining step, in response to the setting request being received, returning a response for requesting transmission of the not-received setting value of the one or more setting values to be used in the linked process to the portable information device, and wherein the termination of the communication period occurs in response to the portable information device becoming outside the range of the predetermined distance.

* * * * *